(12) United States Patent
Shinohara et al.

(10) Patent No.: US 10,451,510 B2
(45) Date of Patent: Oct. 22, 2019

(54) PRESSURE CHANGE MEASUREMENT DEVICE, ALTITUDE MEASUREMENT DEVICE, AND PRESSURE CHANGE MEASUREMENT METHOD

(71) Applicant: SEIKO INSTRUMENTS INC., Chiba-shi, Chiba (JP)

(72) Inventors: Yoko Shinohara, Chiba (JP); Masayuki Suda, Chiba (JP); Manabu Oumi, Chiba (JP); Takeshi Uchiyama, Chiba (JP); Yoshiyuki Kaiho, Chiba (JP); Ayako Nobe, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 298 days.

(21) Appl. No.: 15/503,828

(22) PCT Filed: Aug. 18, 2015

(86) PCT No.: PCT/JP2015/073067
§ 371 (c)(1),
(2) Date: Feb. 14, 2017

(87) PCT Pub. No.: WO2016/047315
PCT Pub. Date: Mar. 31, 2016

(65) Prior Publication Data
US 2017/0276563 A1    Sep. 28, 2017

(30) Foreign Application Priority Data
Sep. 24, 2014   (JP) .................................. 2014-194224

(51) Int. Cl.
*G01L 13/02*    (2006.01)
*G01L 7/02*     (2006.01)
(Continued)

(52) U.S. Cl.
CPC ................ *G01L 13/02* (2013.01); *G01C 5/06* (2013.01); *G01F 1/34* (2013.01); *G01F 1/36* (2013.01);
(Continued)

(58) Field of Classification Search
CPC .......... G01L 13/02; G01L 13/06; G01L 7/02; G01C 5/06; G01F 1/34; G01F 1/36; G01F 1/363; G01F 1/38; G01F 1/383
See application file for complete search history.

(56) References Cited

U.S. PATENT DOCUMENTS

| 3,374,671 A | * | 3/1968 | Williams | ................... G01P 3/62 73/179 |
| 4,238,791 A | * | 12/1980 | Wiebalck | ................... G01P 3/62 244/180 |
| 4,936,142 A | * | 6/1990 | Davidson | ................... G01P 3/62 73/179 |

FOREIGN PATENT DOCUMENTS

| JP | 48012778 | 2/1973 |
| JP | 2052229 | 2/1990 |
| JP | 5650360 | 1/2015 |

OTHER PUBLICATIONS

International Search Report dated Nov. 17, 2015 in International Application No. PCT/JP2015/073067.

* cited by examiner

*Primary Examiner* — Paul M. West
(74) *Attorney, Agent, or Firm* — Adams & Wilks

(57) ABSTRACT

A pressure change measuring apparatus and a pressure change measuring method are capable of detecting a change in pressure to be measured with respect to a time axis with high accuracy. The pressure change measuring apparatus includes a reference value setting unit that generates a reference value signal based on an output signal of a
(Continued)

differential pressure measuring cantilever under a predetermined state and outputs the reference value signal. An arithmetic processing unit calculates the pressure change in the pressure to be measured based on the output signal, the reference value signal, a volume of a cavity, and a flowing quantity of a pressure transmission medium flowing into and out of the cavity for every unit of a predetermined time period.

16 Claims, 21 Drawing Sheets

(51) Int. Cl.
*G01F 1/38* (2006.01)
*G01F 1/36* (2006.01)
*G01C 5/06* (2006.01)
*G01L 7/00* (2006.01)
*G01L 13/06* (2006.01)
*G01F 1/34* (2006.01)

(52) U.S. Cl.
CPC ............... *G01F 1/363* (2013.01); *G01F 1/38* (2013.01); *G01F 1/383* (2013.01); *G01L 7/00* (2013.01); *G01L 7/02* (2013.01); *G01L 13/06* (2013.01)

FIG. 2
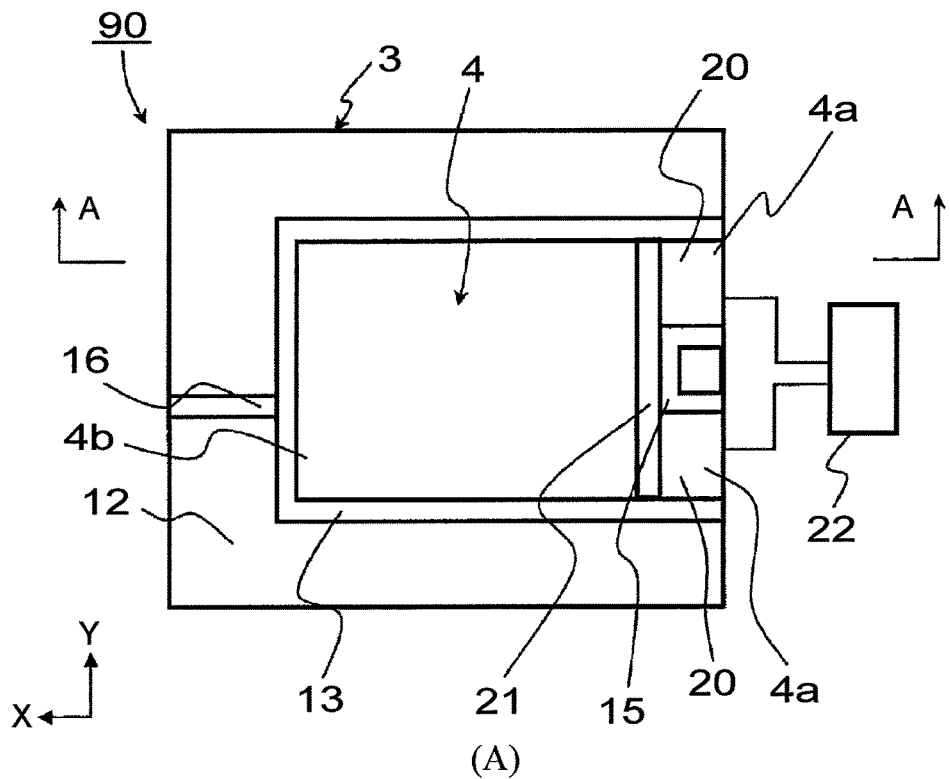
(A)
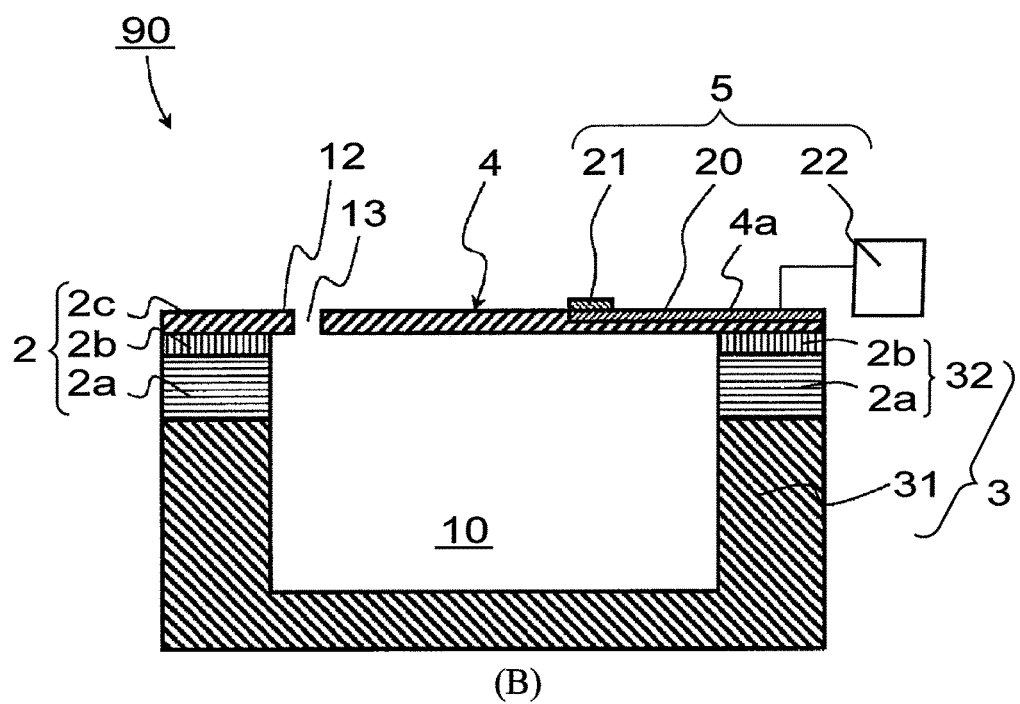
(B)

FIG. 5
(A) Pout=Pin
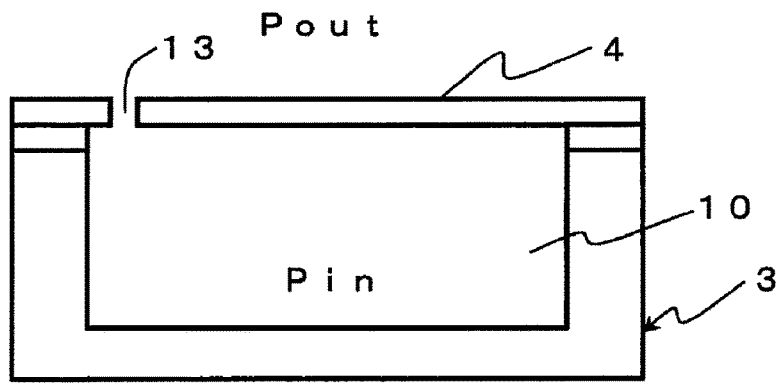
(B) Pout>Pin
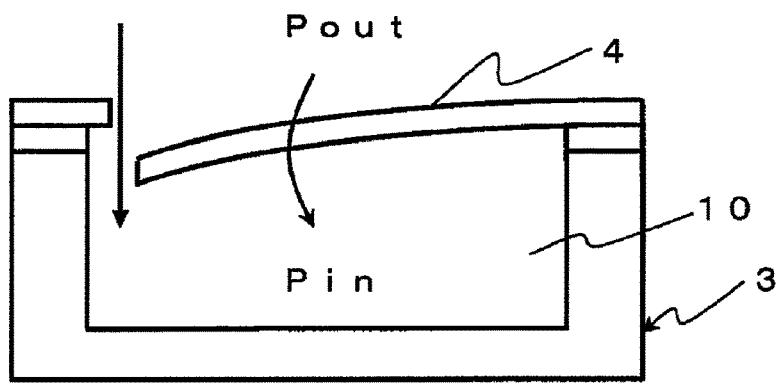
(C) Pout=Pin
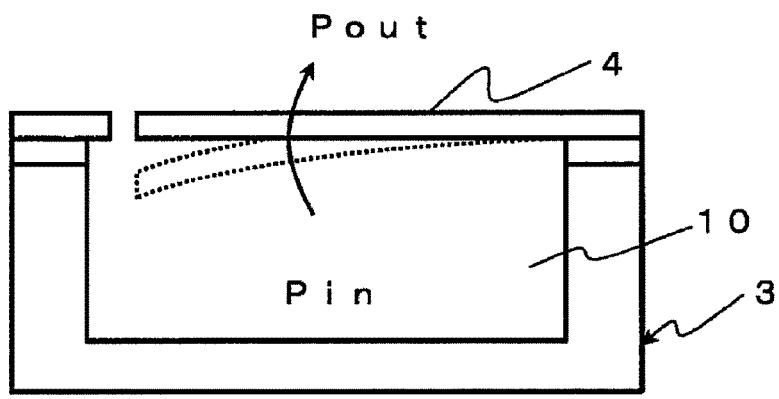

PRESSURE CHANGE MEASUREMENT DEVICE, ALTITUDE MEASUREMENT DEVICE, AND PRESSURE CHANGE MEASUREMENT METHOD

TECHNICAL FIELD

The present invention relates to a pressure change measuring apparatus, an altitude measuring apparatus, and a pressure change measuring method.

BACKGROUND ART

Hitherto, as an apparatus for measuring a change in pressure to be measured, there is known a pressure change measuring apparatus including an inner chamber (pressure chamber), a differential pressure gauge (diaphragm or the like) configured to measure a pressure difference between a pressure of the inner chamber and the pressure to be measured, and a pressure through hole configured to allow a pressure transmission medium for transmitting the pressure to be measured to flow into and out of the inner chamber (see, for example, PTLs 1 and 2).

The pressure through hole has extremely small structure, and restricts the flowing of the pressure transmission medium into the inner chamber. Further, the pressure within the inner chamber changes depending on an amount of the pressure transmission medium flowing into and out of the inner chamber, and hence the pressure within the inner chamber follows the change in pressure to be measured with a delay. Therefore, the pressure difference between the pressure of the inner chamber and the pressure to be measured is measured, to thereby be able to detect the change in pressure to be measured.

CITATION LIST

Patent Literature

[PTL 1] JP 48-12778 A
[PTL 2] JP 02-52229 A
[PTL 3] JP 04-208827 A

SUMMARY OF INVENTION

Technical Problem

However, according to the above-mentioned pressure change measuring apparatus disclosed in PTLs 1 and 2 and described in PTL 3, it is possible to detect a change in pressure to be measured at a predetermined timing from an output signal of the pressure change measuring apparatus, but it is difficult to measure a variation with time of the pressure to be measured, namely, a change in pressure to be measured with respect to a time axis. That is, when the variation with time of the pressure to be measured is measured based on the obtained output signal, it is necessary to measure how much the output signal changes from a reference value under a state in which the pressure to be measured is constant. However, in the related arts, it is not clarified how to set the reference value, which leads to a difficulty in measuring the variation with time of the pressure to be measured with high accuracy. Also in an altitude measuring apparatus for measuring altitude information based on the output result of such a pressure measuring apparatus, it is difficult to measure the altitude information with high accuracy.

Therefore, the present invention has an object to provide a pressure change measuring apparatus, an altitude measuring apparatus, and a pressure change measuring method, which are capable of measuring a variation with time of a pressure to be measured with high accuracy.

Solution to Problem

In order to solve the above-mentioned problem, according to one embodiment of the present invention, there is provided a pressure change measuring apparatus for measuring a change in pressure to be measured, including: a differential pressure sensor, which has a cavity into which a pressure transmission medium for transmitting the pressure to be measured flows and a communication hole for allowing the pressure transmission medium to flow into and out of the cavity, and is configured to output an output signal including information relating to a pressure difference between an inner pressure of the cavity and the pressure to be measured; an arithmetic processing unit configured to calculate the change in pressure to be measured; and a reference value setting unit configured to set a reference value signal indicating a reference value of the output signal of the differential pressure sensor based on the output signal under a predetermined state in which the pressure difference falls within a predetermined range, in which the arithmetic processing unit includes: a differential pressure calculating unit configured to calculate the pressure difference between the inner pressure of the cavity and the pressure to be measured based on the output signal and the reference value signal; a pressure-to-be-measured calculating unit configured to calculate the pressure to be measured based on a set value of the inner pressure of the cavity set in advance and the pressure difference calculated by the differential pressure calculating unit; a flow rate calculating unit configured to calculate a flowing quantity of the pressure transmission medium flowing into and out of the cavity for a predetermined time period based on the pressure difference calculated by the differential pressure calculating unit; and an inner pressure updating unit configured to calculate the inner pressure of the cavity after the predetermined time period based on the flowing quantity calculated by the flow rate calculating unit and a volume of the cavity, and to update, to the calculated inner pressure, the set value of the inner pressure of the cavity to be used by the pressure-to-be-measured calculating unit.

Further, the reference value setting unit includes a determination unit configured to generate the reference value signal based on the output signal of the differential pressure sensor, and the determination unit is configured to determine whether or not a distribution of output signals of the differential pressure sensor falls within a predetermined range, and to determine that the predetermined state is effective when determining that the distribution falls within the predetermined range, to thereby generate the reference value signal.

Further, the reference value setting unit further includes a detection unit configured to detect presence or absence of the change in pressure to be measured, and the determination unit is configured to determine whether or not the distribution of the output signals of the differential pressure sensor falls within the predetermined range when the detection unit detects that there is no change in pressure to be measured.

Further, the detection unit includes an absolute pressure sensor configured to detect an absolute pressure around the pressure change measuring apparatus, and the determination unit is configured to detect the presence or absence of the change in pressure to be measured based on a change in output signal of the absolute pressure sensor.

Further, the detection unit includes a casing with an air hole, which is provided between the differential pressure sensor and the pressure to be measured, and a flow rate sensor connected to the air hole, and the determination unit is configured to detect the presence or absence of the change in pressure to be measured based on the change in output signal of the flow rate sensor.

Further, the detection unit includes a detection unit configured to detect whether or not the pressure change measuring apparatus is in a stationary state, and the determination unit is configured to determine whether or not the distribution falls within the predetermined range when the detection unit detects that the pressure change measuring apparatus is in the stationary state.

Further, the detection unit further includes an inertia sensor configured to detect an inertial force acting on the pressure change measuring apparatus, and the determination unit is configured to detect the stationary state based on the change in output signal of the inertia sensor.

Further, the detection unit includes a positioning system mechanism configured to acquire positioning information on the pressure change measuring apparatus, and the determination unit is configured to detect the stationary state based on a change in positioning information of the positioning system mechanism.

Further, the reference value setting unit further includes a pressure adjusting unit configured to equalize the inner pressure of the cavity and the pressure to be measured, and the determination unit is configured to cause the pressure adjusting unit to conduct adjustment for equalizing the inner pressure of the cavity and the pressure to be measured before acquiring the output signal from the differential pressure sensor.

Further, the pressure adjusting unit includes an opening-and-closing mechanism configured to open and close an air hole provided separately from the communication hole for allowing outdoor air to flow into the cavity.

Further, the reference value setting unit further includes a differential pressure control unit configured to change the pressure difference to a predetermined value, and the determination unit is configured to cause the differential pressure control unit to control the pressure difference to change before acquiring the output signal from the differential pressure sensor.

Further, the differential pressure control unit includes a membrane actuator provided to a cavity casing that defines the cavity.

Further, the differential pressure sensor includes: a cantilever, which is provided so as to block an opening surface of the cavity other than the communication hole, and is configured to bend to be deformed depending on the pressure difference between the inner pressure of the cavity and the pressure to be measured; and a displacement measuring unit configured to measure a displacement corresponding to the flexural deformation of the cantilever.

Further, the differential pressure sensor is formed of a passage shape in which the communication hole communicates to/from an opening portion of the cavity, and the differential pressure sensor includes: a heat source arranged inside the communication hole; a pair of temperature sensors arranged across the heat source with equal intervals; and a differential pressure measuring unit configured to measure a pressure difference between both ends of the communication hole based on output signals of the pair of temperature sensors.

Further, according to one embodiment of the present invention, there is provided an altitude measuring apparatus, which is configured to convert a change in pressure to be measured obtained from the pressure change measuring apparatus into an altitude information amount and output the change.

Further, according to one embodiment of the present invention, there is provided a pressure change measuring method for measuring a change in pressure to be measured by a pressure change measuring apparatus including a differential pressure sensor, which has a cavity into which a pressure transmission medium for transmitting the pressure to be measured flows and a communication hole for allowing the pressure transmission medium to flow into and out of the cavity, and is configured to output an output signal including information relating to a pressure difference between an inner pressure of the cavity and the pressure to be measured, the pressure change measuring method including: a reference value generating step of generating a reference value signal based on the output signal of the differential pressure sensor under a predetermined state in which the pressure difference falls within a predetermined range; a differential pressure calculating step of calculating the pressure difference between the inner pressure of the cavity and the pressure to be measured based on the output signal and the reference value signal; a pressure-to-be-measured calculating step of calculating the pressure to be measured based on a set value of the inner pressure of the cavity set in advance and the pressure difference calculated in the differential pressure calculating step; a flow rate calculating step of calculating a flowing quantity of the pressure transmission medium flowing into and out of the cavity for every unit of a predetermined time period based on the pressure difference calculated in the pressure difference calculating step; and an inner pressure updating step of calculating the inner pressure of the cavity after the predetermined time period based on the flowing quantity calculated in the flow rate calculating step and a volume of the cavity, and updating, to the calculated inner pressure, the set value of the inner pressure of the cavity to be used in the pressure-to-be-measured calculating step.

Advantageous Effects of Invention

As described above, according to the present invention, it is possible to provide the pressure change measuring apparatus, the altitude measuring apparatus, and the pressure change measuring method, which are capable of measuring a variation with time of the pressure to be measured with high accuracy.

BRIEF DESCRIPTION OF DRAWINGS

FIG. 2 are explanatory diagrams for illustrating structure of a differential pressure sensor to be used for the pressure change measuring apparatus according to the first embodiment.

FIG. 5 are explanatory diagrams for illustrating an action of a differential pressure measuring cantilever included in the pressure change measuring apparatus according to the first embodiment.

DESCRIPTION OF EMBODIMENTS

Now, a pressure change measuring apparatus according to the present invention is described with reference to the accompanying drawings.

First Embodiment

1-1: Overall Configuration

Figure 1:
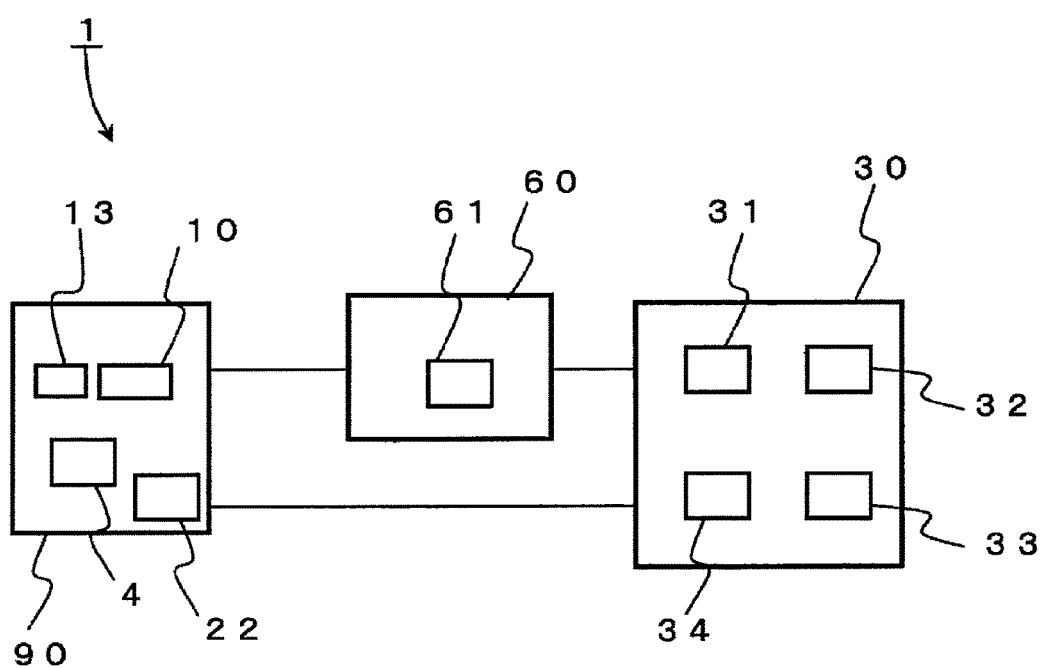
FIG. 1 is a configuration diagram for illustrating a pressure change measuring apparatus according to a first embodiment of the present invention.

FIG. 1 is an illustration of a configuration of a pressure change measuring apparatus 1 according to a first embodiment of the present invention.

The pressure change measuring apparatus 1 according to the first embodiment includes: a differential pressure sensor 90; a reference value setting unit 60 configured to determine whether or not an output of the differential pressure sensor 90 satisfies a predetermined condition, and to generate a reference value signal from an output signal of the differential pressure sensor 90 when the predetermined condition is satisfied; and an arithmetic processing unit 30 configured to calculate a change in pressure to be measured based on the output signal of the differential pressure sensor 90 and the reference value signal set by the reference value setting unit 60.

The differential pressure sensor 90, structure of which is described later in detail, includes: a cavity 10; a gap 13 being a communication hole configured to allow a pressure transmission medium for transmitting the pressure to be measured to flow into and out of the cavity 10; a differential pressure measuring cantilever 4 configured to measure a pressure difference between an inner pressure of the cavity 10 and the pressure to be measured; and a detection circuit 22 configured to convert the pressure difference measured by the differential pressure measuring cantilever 4 into an electric signal.

The reference value setting unit 60 is connected to the differential pressure sensor 90 and the arithmetic processing unit 30, and includes: a determination unit 61 configured to determine whether or not the output of the differential pressure sensor 90 satisfies the predetermined condition; and a storage device (not shown) configured to store programs and the like.

The arithmetic processing unit 30 is connected to the detection circuit 22 and the reference value setting unit 60, and includes: an integrated circuit (differential pressure calculating unit 31, pressure-to-be-measured calculating unit 32, flow rate calculating unit 33, and inner pressure updating unit 34) configured to conduct processing for calculating a pressure change to be measured; and a storage device (not shown) configured to store programs and values to be used by the integrated circuit.

Next, a detailed configuration of the differential pressure sensor 90 is described with reference to FIG. 2.

The differential pressure sensor 90 includes: a differential pressure measuring cantilever 4 configured to be deformed depending on a pressure difference between both sides of the differential pressure measuring cantilever 4; a lid 12 arranged so as to have one end opposed to the differential pressure measuring cantilever 4; a displacement measuring unit 5 configured to measure a displacement of the differential pressure measuring cantilever 4; and a cavity casing 3 arranged on one surfaces of the differential pressure measuring cantilever 4 and the lid 12.

The cavity casing 3 is a box-shaped member having the cavity 10 formed inside. For example, the cavity casing 3 includes: a first portion 31 formed of a ceramic material to define the cavity 10; and a second portion 32 arranged on the first portion 31 and including a silicon support layer 2a and an oxide layer 2b, e.g., a silicon oxide film, which are described later.

The differential pressure measuring cantilever 4 is formed by, for example, processing an SOI substrate 2 obtained by thermally bonding the silicon support layer 2a, the oxide layer 2b, e.g., a silicon oxide film, and a silicon active layer 2c to one another. Specifically, the differential pressure measuring cantilever 4 is formed of the silicon active layer 2c included in the SOI substrate 2, and has a shape obtained by cutting out, from the silicon active layer 2c having a flat shape, a gap 13 formed to have a U shape in plan view.

With this configuration, the differential pressure measuring cantilever 4 has cantilever beam structure in which the base end portion 4a is set as a fixed end and a leading end portion 4b being an end portion on the side opposed to the lid 12 is set as a free end.

Further, the differential pressure measuring cantilever 4 is arranged so as to cover an upper surface of the cavity 10 formed in the cavity casing 3. In short, the differential pressure measuring cantilever 4 substantially blocks an opening of the cavity 10.

The differential pressure measuring cantilever 4 is cantilever-supported by being integrally fixed onto the second portion 32 of the cavity casing 3 through the base end portion 4a. This allows the differential pressure measuring cantilever 4 to bend to be deformed relative to the base end portion 4a serving as a fixed end depending on a pressure difference (pressure difference) between the inside and outside of the cavity 10.

A through hole 15 having a U shape in plan view is formed in the base end portion 4a of the differential pressure measuring cantilever 4 so as to facilitate the flexural deformation of the differential pressure measuring cantilever 4. However, the shape of the through hole 15 is not limited to the above-mentioned U shape as long as the shape facilitates the flexural deformation of the differential pressure measuring cantilever 4.

The lid 12 is positioned above the cavity 10, and is arranged around the differential pressure measuring cantilever 4 across the gap 13. The lid 12 is formed of the silicon active layer 2c.

The displacement measuring unit 5 includes: piezoresistors 20 configured to have an electric resistance value changed depending on a stress applied thereto from the outside; and the detection circuit 22 configured to extract the change in electric resistance value.

As illustrated in FIG. 1, a pair of piezoresistors 20 are arranged on both sides across the through hole 15 in a Y direction. The pair of piezoresistors 20 are electrically connected to each other through a wiring 21 formed of a conductive material.

An overall shape including the wiring 21 and the piezoresistors 20 can be formed to have a U shape in plan view as illustrated in, for example, FIG. 1, but it should be understood that the shape may have another layout.

The detection circuit 22 is a circuit which is connected to the piezoresistors 20, and is configured to output a signal based on the change in electric resistance value of the piezoresistors 20.

Figure 3:
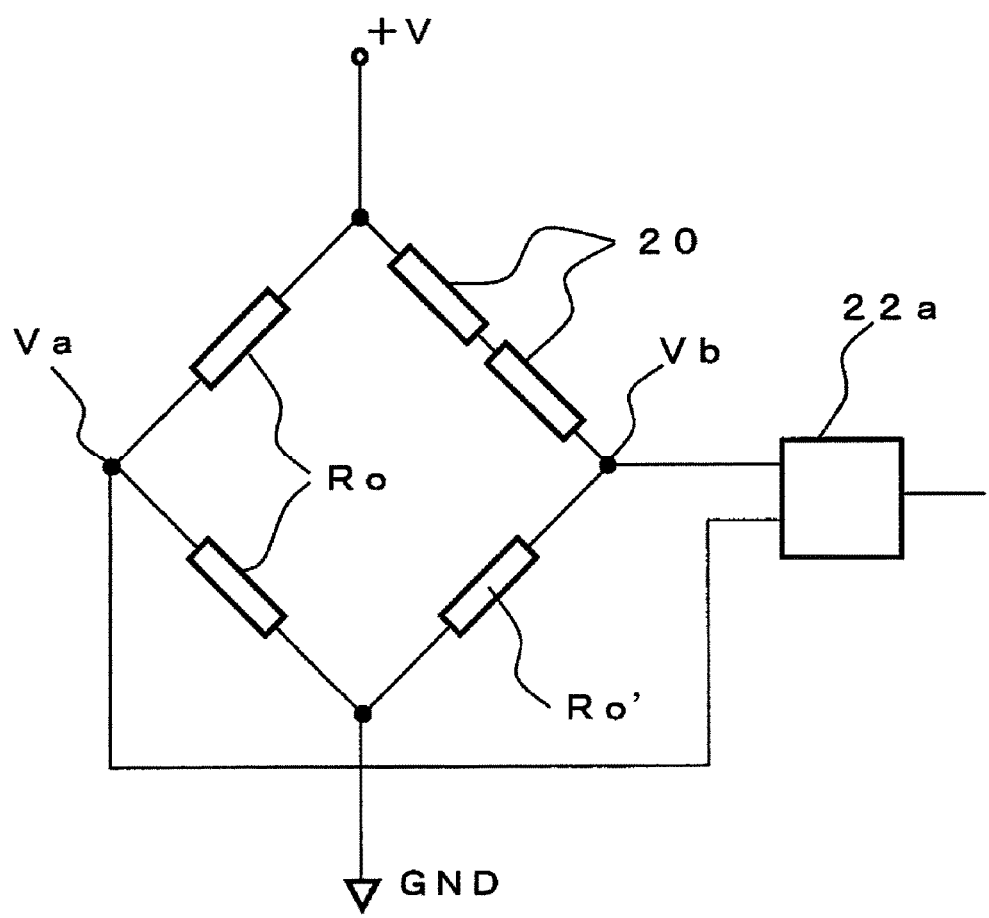
FIG. 3 is an explanatory diagram for illustrating a configuration of a detection circuit included in the pressure change measuring apparatus according to the first embodiment.

The detection circuit 22 described above includes a bridge circuit and an amplifier circuit 22a as illustrated in, for example, FIG. 3. That is, the detection circuit 22 can extract the change in electric resistance value of the piezoresistors 20 as a voltage change by forming the bridge circuit through use of the piezoresistors 20, fixed resistors Ro, and a variable resistor Ro'. Then, the detection circuit 22 amplifies the voltage change by the amplifier circuit 22a with a predetermined gain, and outputs the amplified voltage change.

The piezoresistors 20 described above are formed by, for example, doping the silicon active layer 2c with a dopant (impurities), e.g., phosphorus, by an ion implantation method, a diffusion method, or other such various methods. The dopant is added to only the vicinity of the surface of the silicon active layer 2c. Therefore, the change in electric resistance value of the piezoresistors 20 is exhibited in a reverse direction in terms of plus or minus to a direction of compression or extension of the stress applied to the differential pressure measuring cantilever 4.

The pair of the piezoresistors 20 are configured to become electrically conductive to each other through only the wiring 21. Therefore, the silicon active layer 2c in the vicinity of the wiring 21 within the differential pressure measuring cantilever 4 includes a groove portion 16 formed by removing the silicon active layer 2c by etching or the like so as to inhibit the piezoresistors 20 from becoming conductive to each other through any portion other than the wiring 21. The silicon active layer 2c in the vicinity of the wiring 21 described above may be partially doped with impurities, to thereby omit the etching.

1-2: Action of Differential Pressure Measuring Cantilever When Pressure Changes and Output Characteristic of Detection Circuit Next, an action of the differential pressure measuring cantilever 4 conducted when a pressure to be measured changes and an output characteristic of the detection circuit 22 exhibited at that time are described with reference to FIG. 4 and FIG. 5. In the following description, the pressure to be measured is referred to as "outer pressure Pout". The outer pressure Pout represents a pressure on the side of a surface opposed to a surface where the differential pressure measuring cantilever 4 is arranged onto the cavity casing 3 (that is, upper surface in FIG. 2). The inner pressure inside the cavity 10 is defined as an inner pressure Pin, and is set to the outer pressure Pout.

Figure 4:
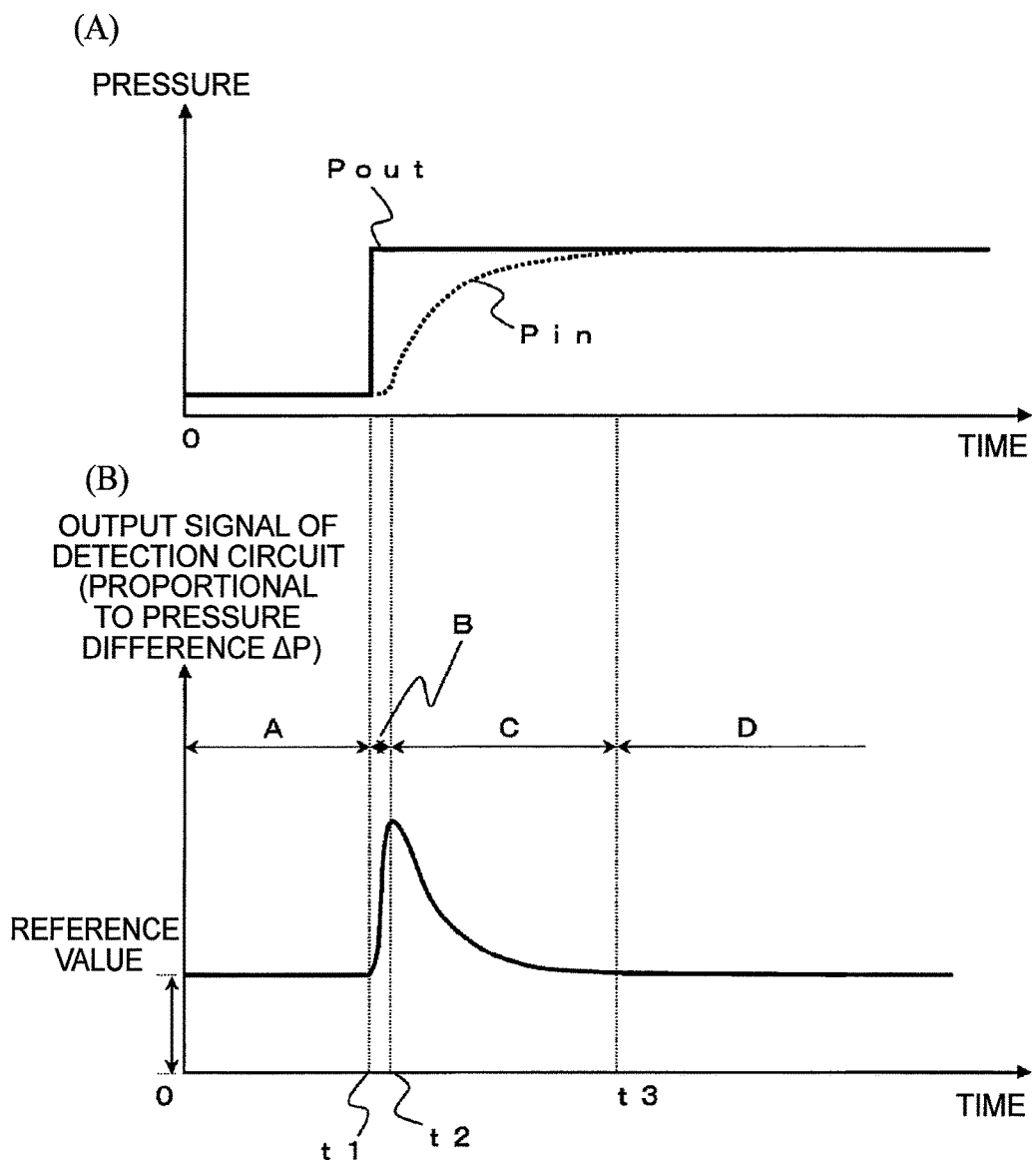
FIG. 4 are explanatory diagrams for showing output of the detection circuit included in the pressure change measuring apparatus according to the first embodiment.

FIG. 4 are graphs for schematically showing an example of the output characteristic of the detection circuit 22 illustrated in FIG. 1. FIG. 4(A) is a graph for showing variations with time of the outer pressure Pout and the inner pressure Pin, and FIG. 4(B) is a graph for showing a variation with time of the output signal of the detection circuit 22. FIG. 5 are sectional views for schematically illustrating an example of the action of the differential pressure measuring cantilever 4 illustrated in FIG. 1 and FIG. 2. FIG. 5(A) is the sectional view of the differential pressure measuring cantilever 4 for illustrating an initial state, FIG. 5(B) is the sectional view of the differential pressure measuring cantilever 4 for illustrating a state in which the outer pressure Pout is higher than the inner pressure Pin, and FIG. 5(C) is the sectional view of the differential pressure measuring cantilever 4 for illustrating a state in which the pressures inside and outside the cavity have become the same again. In FIG. 5, the illustration of the detection circuit 22 is omitted.

First, when the outer pressure Pout and the inner pressure Pin are equal to each other with the pressure difference ΔP being zero as shown in a period A within FIG. 4(A), the differential pressure measuring cantilever 4 does not bend to be deformed as illustrated in FIG. 5(A).

For example, when the outer pressure Pout rises stepwise as shown in a period B after a time t1 within FIG. 4(A), the inner pressure Pin cannot rapidly change, and produces the pressure difference ΔP. Thus, as illustrated in FIG. 5(B), the differential pressure measuring cantilever 4 bends to be deformed toward the inside of the cavity 10. Then, a stress is applied to the piezoresistors 20 depending on the flexural deformation of the differential pressure measuring cantilever 4, and the electric resistance value changes. Therefore, as shown in FIG. 4(B), the output signal of the detection circuit 22 increases.

After the rise of the outer pressure Pout (after the time t1), the pressure transmission medium gradually flows into the inside of the cavity 10 from the outside through the gap 13. Therefore, as shown in FIG. 4(A), with the lapse of time, the inner pressure Pin rises with a delay from the outer pressure Pout while gently responding to changes of the outer pressure Pout.

As a result, the inner pressure Pin gradually approaches the outer pressure Pout, and hence the bending of the differential pressure measuring cantilever 4 gradually decreases, which gradually lowers the above-mentioned output signal as shown in FIG. 4(B).

When the inner pressure Pin becomes the same as the outer pressure Pout as shown in a period D after a time t3 within FIG. 4(A), as illustrated in FIG. 5(C), the flexural deformation of the differential pressure measuring cantilever 4 is canceled to recover the initial state illustrated in FIG. 5(A). In addition, as shown in FIG. 4(B), the output signal of the detection circuit 22 returns to the same value as that of the initial state of the period A.

The output signal of the detection circuit 22 is obtained by adding a reference voltage in the initial state and a signal amplified based on a resistance change of the piezoresistors 20. The reference voltage in the initial state represents a voltage value obtained by amplifying a voltage difference between bridge circuit voltage dividing points Va and Vb illustrated in FIG. 3 by the amplifier circuit 22a when a pressure difference ΔP applied to the differential pressure measuring cantilever 4 is zero. As described later, the reference value setting unit 60 determines whether or not the current state is the initial state, namely, a state (predetermined state) in which the pressure difference ΔP (=Pout-Pin) between the inner pressure Pin and the outer pressure Pout falls within a predetermined range, measures the reference voltage, and sets the reference voltage as a reference value. The wording "within a predetermined range" referred to herein represents specifically a range of equal to or less than 1 Pa, and preferably a range of equal to or less than 0.5 Pa.

In this manner, it is possible to measure deformation of the differential pressure measuring cantilever 4, a time variation of the pressure difference ΔP, and a time variation of the outer pressure Pout by monitoring the output signal of the detection circuit 22 based on the displacement of the differential pressure measuring cantilever 4.

In particular, the differential pressure measuring cantilever 4 can be formed by a semiconductor processing technology through use of the silicon active layer 2c of the SOI substrate 2, and is therefore extremely easy to be made thinner (to have a thickness of, for example, from several tens to several hundreds of nanometers) than the related-art piezoelectric element. Therefore, it is possible to detect minute pressure changes with satisfactory accuracy.

In addition, when the outer pressure Pout changes extremely gradually, a function of the gap 13 for restricting the flowing of the pressure transmission medium does not work, and the inner pressure Pin keeps substantially the same pressure value as that of the outer pressure Pout without a delay, which does not cause the pressure difference ΔP. However, in this embodiment, by taking advantage of the above-mentioned phenomenon, it is possible to ignore the change in outer pressure Pout when the outer pressure Pout changes at extremely slow speed (for example, when the atmospheric pressure changes due to a weather change or the like). Therefore, the change in atmospheric pressure due to a weather change or the like can be eliminated as noise.

1-3: Control Processing of Pressure Change Measuring Apparatus

Next, referring to a flowchart of FIG. 4, a description is made of processing for calculating a change of a change to the outer pressure Pout.

First, there occurs a change in outer pressure of the pressure change measuring apparatus 1, namely, the outer pressure Pout (Step S1).

Then, the inner pressure Pin being the inner pressure inside the cavity 10 changes so as to follow the change in outer pressure Pout exhibited in Step S1 (Step S2). In this case, the gap 13 functions as a communication hole configured to communicate between the inside and outside of the cavity 10, and hence a pressure transmission medium moves from a high-pressure side to a low-pressure side depending on the differential pressure applied to both sides of the differential pressure measuring cantilever 4. However, the movement of the pressure transmission medium is regulated by the minute gap 13, and hence the inner pressure Pin does not rapidly change depending on the change in outer pressure Pout, and follows the change in outer pressure Pout with a delay.

Then, a pressure difference (hereinafter referred to as "pressure difference ΔP=Pout-Pin") occurs between both side surfaces of the differential pressure measuring cantilever 4 due to the above-mentioned delay of the inner pressure Pin from the change in outer pressure Pout (Step S3). As a result, the differential pressure measuring cantilever 4 bends to be deformed depending on a level of the pressure difference ΔP of Step S4 (Step S4).

When the differential pressure measuring cantilever 4 bends to be deformed, a stress is applied to the piezoresistors 20 provided to the base end portion of the differential pressure measuring cantilever 4 (Step S5), and the electric resistance value of the piezoresistors 20 changes (Step S6). In this case, the detection circuit 22 detects a change in electric resistance value of the piezoresistors 20 of Step S6 by causing current to flow through the piezoresistors 20 (Step S7). When the signal corresponding to the change in electric resistance value of the piezoresistors 20 is input from the detection circuit 22, the arithmetic processing unit 30 calculates the change in outer pressure Pout based on the input signal and the reference value signal input from the reference value setting unit 60 (Step S8).

With this processing, the arithmetic processing unit 30 can calculate the change in outer pressure Pout.

1-4: Processing for Calculating Change in Outer Pressure Pout by Arithmetic Processing Unit Next, referring to flowcharts of FIG. 7 and FIG. 8, a detailed description is made of processing for calculating the change in outer pressure Pout by the arithmetic processing unit 30, which is described in Step S8 of FIG. 4.

Figure 7:
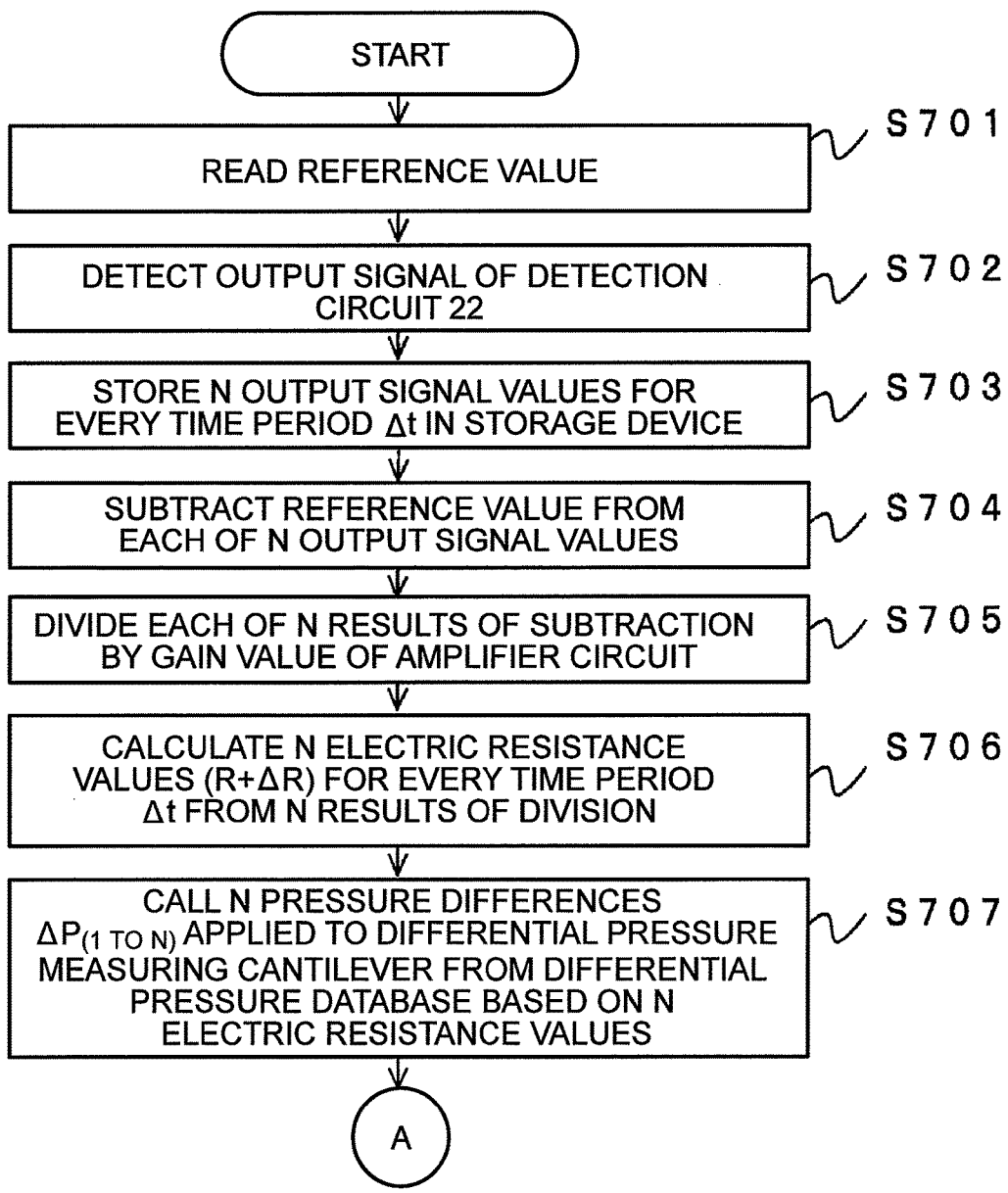
FIG. 7 is a flowchart for illustrating a flow of processing of an arithmetic processing unit included in the pressure change measuring apparatus according to the first embodiment.

First, as illustrated in FIG. 7, the arithmetic processing unit 30 reads the reference value stored (set in advance) in the storage device based on the reference value signal received from the reference value setting unit 60 (Step S701). Note that, processing for generating the reference value signal by the reference value setting unit 60 is described later in detail with reference to FIG. 9.

Subsequently, when the output signal is detected within the detection circuit 22 as described in Step S8 (Step S702), the arithmetic processing unit 30 stores N values of the output signal of the detection circuit 22 in the storage device (not shown) for every fixed time period Δt (Step S703).

Subsequently, the arithmetic processing unit 30 subtracts the reference value stored in Step S701 from N output signals described above during a calculation period (N×Δt) to calculate only a part of a change in resistance value of the piezoresistors 20 (Step S704). Subsequently, the arithmetic processing unit 30 divides a result of the above-mentioned subtraction by an amplification factor (gain value) of the amplifier circuit 22*a* included in the detection circuit 22, to thereby calculate N voltage values of the part that is based on the change in resistance value of the piezoresistors 20 among voltage values for every fixed time period Δt, which are output from the bridge circuit illustrated in FIG. 3 (Step S705).

Subsequently, the arithmetic processing unit 30 calculates N electric resistance values R+ΔR of the piezoresistors 20 for every fixed time period Δt from a result of the division conducted in Step S705 (voltage value obtained from the bridge circuit based on the change in resistance value of the piezoresistors 20), resistance values Ro of the resistor elements included in the bridge circuit, and a voltage supplied to the bridge circuit (Step S706). The electric resistance value R represents an electric resistance value of the piezoresistors 20 obtained when the pressure difference ΔP is zero, and the electric resistance value ΔR represents a change of the piezoresistors 20, which has been exhibited depending on the applied pressure difference ΔP.

Subsequently, the differential pressure calculating unit 31 of the arithmetic processing unit 30 obtains N pressure differences ΔP (ΔP(1 to N)) applied to the differential pressure measuring cantilever 4 from a differential pressure database based on the electric resistance values R+ΔR of the piezoresistors 20 calculated in Step S706 (Step S707; differential pressure calculating step).

The differential pressure database stores a relationship between the pressure difference ΔP and a change rate ΔR/R of the electric resistance value for each pressure difference ΔP. Specifically, the above-mentioned differential pressure database is a numerical database built by measuring in advanced an output value of the detection circuit 22 when the pressure difference ΔP is applied to the differential pressure measuring cantilever 4, and by storing, in the storage device of the arithmetic processing unit 30, a value of the pressure difference ΔP and the change rate ΔR/R of the electric resistance value calculated from the above-mentioned measured value in association with each other.

Therefore, the differential pressure calculating unit 31 of the arithmetic processing unit 30 can calculate the pressure difference ΔP applied to the differential pressure measuring cantilever 4 with reference to the differential pressure database based on the electric resistance value R of the piezoresistors 20 obtained when the pressure difference ΔP is zero, and the electric resistance value R+ΔR of the piezoresistors 20 calculated in Step S706.

Figure 8:
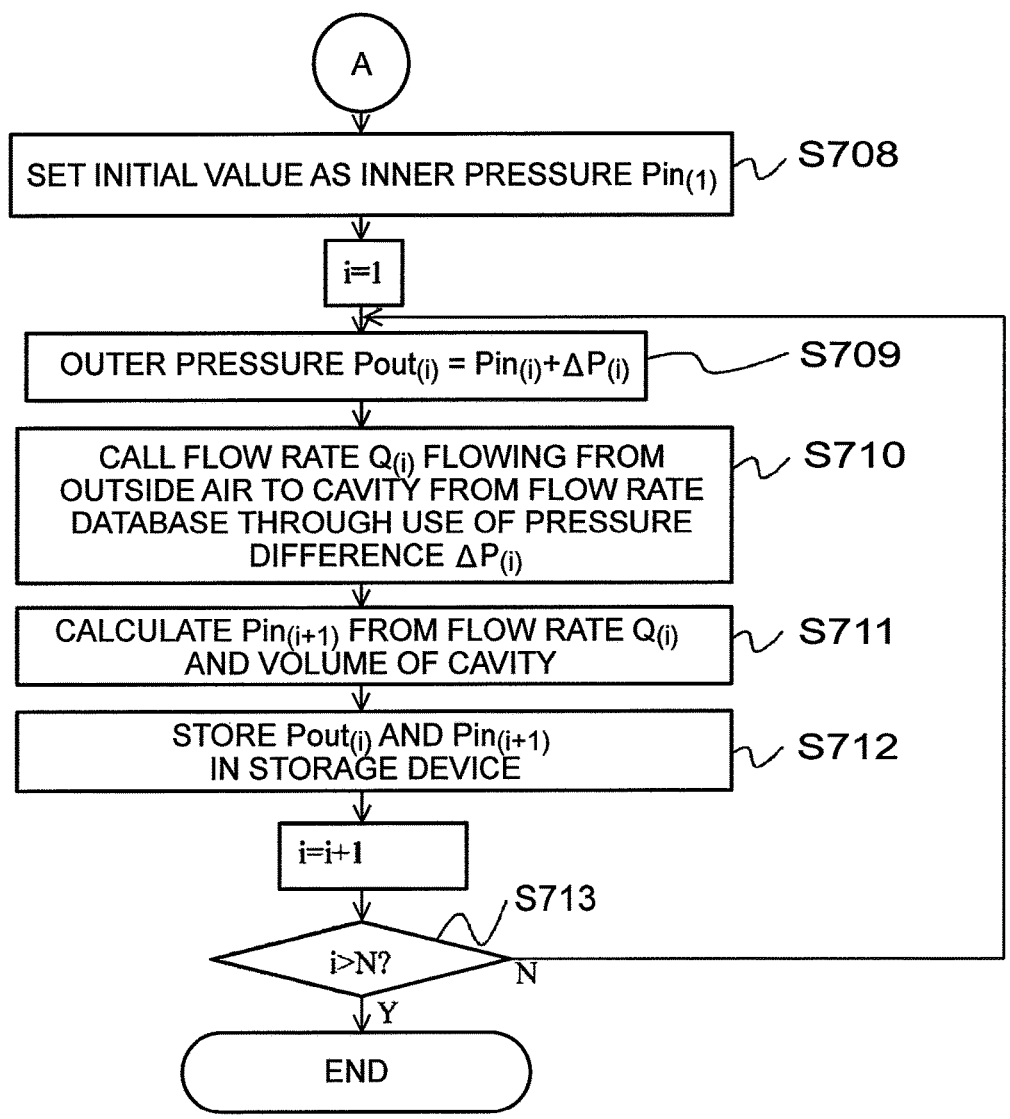
FIG. 8 is a flowchart for illustrating a flow of processing of an arithmetic processing unit included in the pressure change measuring apparatus according to the first embodiment.

Subsequently, as illustrated in FIG. 8, the pressure-to-be-measured calculating unit 32 of the arithmetic processing unit 30 sets an initial value as a first inner pressure Pin(1) at the earliest time among inner pressures Pin(i) (i=1 to N; N represents a natural number equal to or larger than 2) (Step S708). The inner pressure Pin(1) according to this embodiment is set to the atmospheric pressure on the assumption that the apparatus is used in the air.

Subsequently, the pressure-to-be-measured calculating unit 32 of the arithmetic processing unit 30 adds Pin(i) and the pressure difference ΔP(i) to calculate an outer pressure Pout(i) (Step S709; pressure-to-be-measured calculating step).

Subsequently, the flow rate calculating unit 33 of the arithmetic processing unit 30 uses the pressure difference ΔP(i) to read a flow rate Q(i) of the pressure transmission medium flowing into the cavity 10 from a flow rate database (Step S710; flow rate calculating step).

The flow rate database (flow rate database unit) is built by storing in advance, in the storage device, a relationship between the pressure difference ΔP and a flow rate Q for each value of the pressure difference ΔP. With this configuration, it is possible to obtain a relationship between the pressure difference ΔP and the flow rate Q of the pressure transmission medium flowing between both sides of the differential pressure measuring cantilever 4. In short, the flow rate calculating unit 33 of the arithmetic processing unit 30 can identify the flow rate Q of the pressure transmission medium flowing into the cavity based on the pressure difference ΔP with reference to the flow rate database built from the above-mentioned relationship.

Subsequently, the inner pressure updating unit 34 of the arithmetic processing unit 30 calculates the inner pressure Pin(i+1) after a time period of Δt from the flow rate Q(i) and a volume V of the cavity (Step S711). It is assumed that the fixed time period Δt is extremely short, the change of the outer pressure Pout for every Δt is extremely small, and a heat transfer and a pressure loss are negligibly small. Therefore, the inner pressure Pin increases in proportion to an amount of the pressure transmission medium that has flowed in the cavity 10. Hence, a relationship among the flow rate Q(i), the volume V, the inner pressure Pin(i+1), and the inner pressure Pin(i) can be expressed by Expression (1).

$$Pin(i) \times (V + Q(i) \times \Delta t) = Pin(i+1) \times V \tag{1}$$

Therefore, the inner pressure updating unit 34 of the arithmetic processing unit 30 can obtain Pin(i+1) after the time period of Δt by Expression (2).

$$Pin(i+1) = (V + Q(i) \times \Delta t) \times Pin(i) / V \tag{2}$$

Subsequently, the arithmetic processing unit 30 stores Pin(i+1) obtained in Step S711 and Pout (i) calculated initially in the storage device included in the arithmetic processing unit 30 (Step S712).

Subsequently, the arithmetic processing unit 30 substitutes i+1 into i, and determines whether or not i exceeds N (Step S713). When determining that i is equal to or smaller than N (Step S713; N), the arithmetic processing unit 30 repeatedly conducts the processing of Steps S709 to S712 (iterative processing step). During the iteration, the inner pressure updating unit 34 of the arithmetic processing unit 30 updates the inner pressure Pin used in Step S709 to Pin(i+1) calculated in Step S711 (inner pressure updating step).

When determining that i exceeds N (Step S713; Y), the arithmetic processing unit 30 brings the processing to an end. This allows the arithmetic processing unit 30 to accumulate N outer pressures Pout for every time period of Δt within the storage device. This information indicates how the outer pressure Pout has changed during the period of N×Δt.

Note that, the above-mentioned Δt (predetermined time period) may be a value set in advance by the arithmetic processing unit 30, or may be appropriately set by a user through a user interface unit (not shown) included in the pressure change measuring apparatus 1.

With the above-mentioned processing, the arithmetic processing unit 30 can measure the change in outer pressure Pout, which cannot be easily obtained from the output signal of the detection circuit 22 and the reference value signal of the reference value setting unit 60.

1-5: Reference Value Generation Processing of Reference Value Setting Unit

Figure 6:
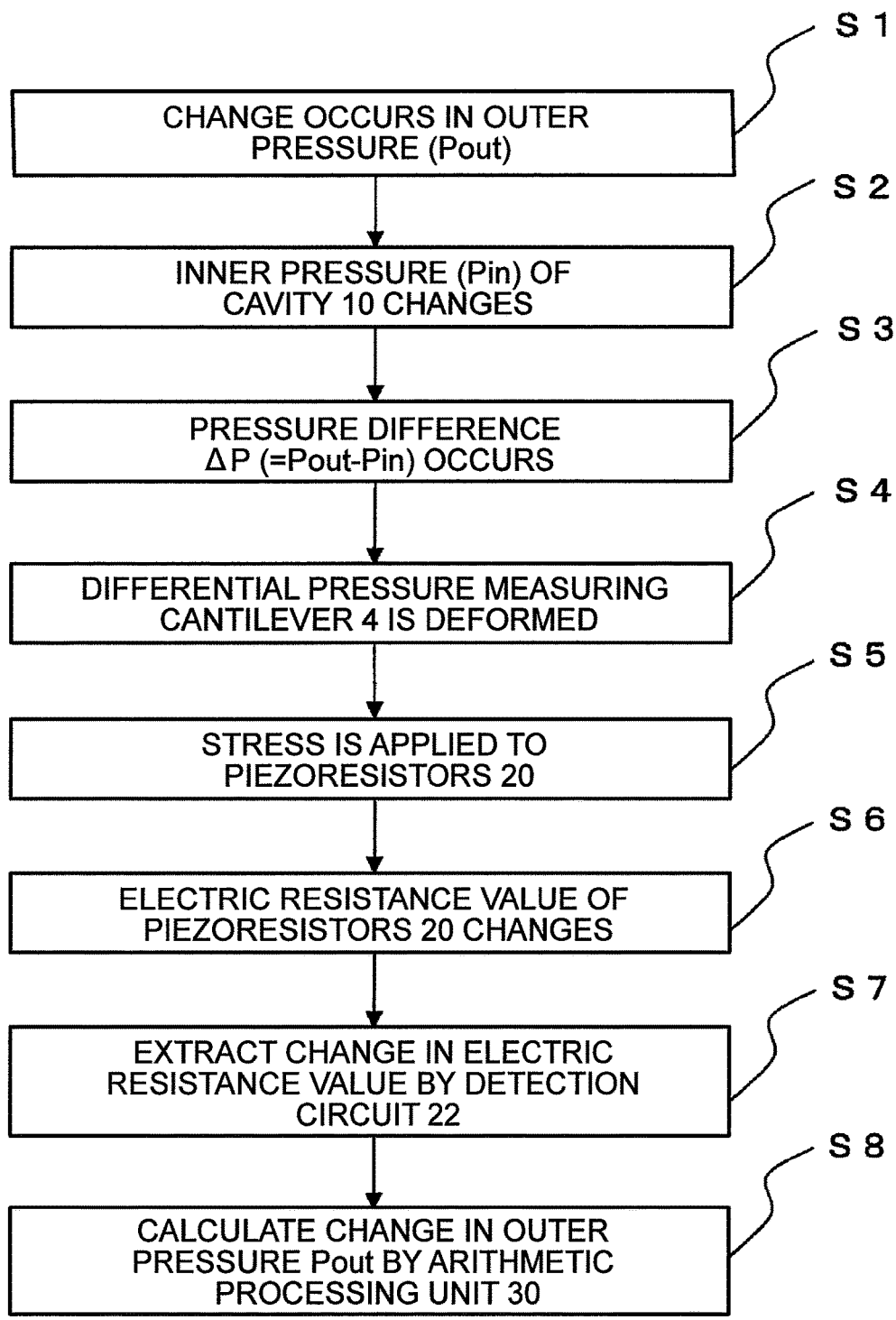
FIG. 6 is an explanatory diagram for illustrating an action of the pressure change measuring apparatus according to the first embodiment.
Figure 9:
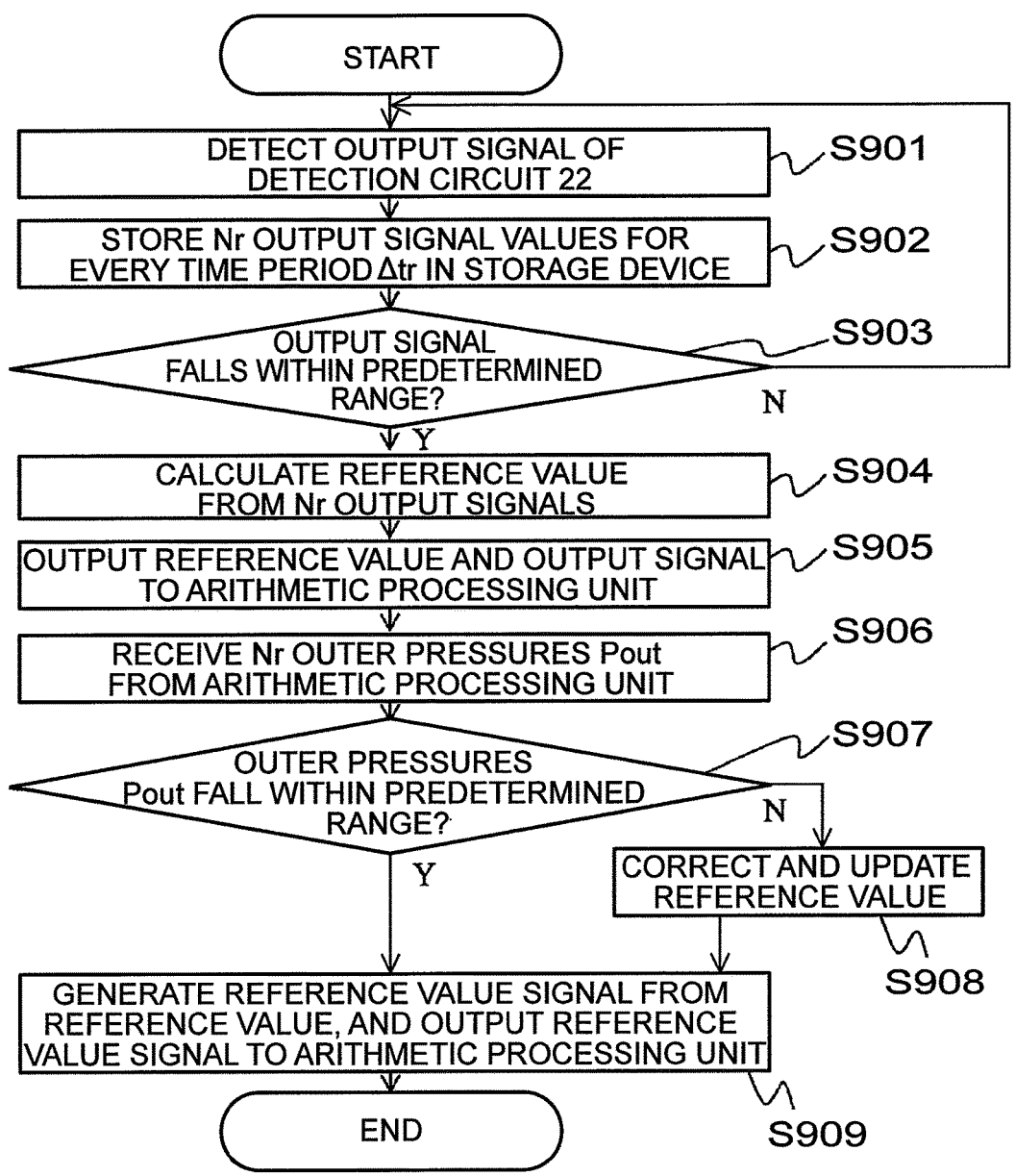
FIG. 9 is a flowchart for illustrating a flow of processing of a reference value setting unit included in the pressure change measuring apparatus according to the first embodiment.

Next, a method of generating the reference value signal by the reference value setting unit 60 in Step S701 of FIG. 7 is described with reference to FIG. 9. FIG. 9 is a flowchart for illustrating a flow of processing for calculating and updating the reference value based on the output signal of the detection circuit 22 by the reference value setting unit 60. Generation processing of the reference value setting unit 60 is roughly conducted by arithmetically operating from the change in outer pressure Pout to the output signal of the detection circuit 22 within the control processing of the pressure change measuring apparatus 1, which is described with reference to FIG. 4, approximately in a reverse order. In short, arithmetic operation processing is conducted in Step S1 to Step S8 within FIG. 6 approximately in a reverse order.

First, when receiving the output signal of the detection circuit 22 (Step S901), the reference value setting unit 60 stores Nr values of the output signal of the detection circuit 22 in the storage device (not shown) for every time period $\Delta tr$ (Step S902).

Subsequently, the determination unit 61 of the reference value setting unit 60 determines whether or not a distribution of output signals of the differential pressure sensor 90, specifically, the distribution of Nr output signals described above, falls within a predetermined range during a determination period (Nr×$\Delta tr$), and when determining that the distribution falls within the predetermined range, determines that the outer pressure Pout is substantially constant and that the pressure difference $\Delta P$ is in a state around zero, namely, the predetermined state (Step S903).

More specifically, for example, in a case where a noise width of the output signal stored above in Step S902 is represented by Vn and a time constant at a time of step response is represented by $\tau$, the determination unit 61 sets the determination period as $\tau$ and determines that the "distribution of output signals falls within a predetermined range" when a difference between the maximum value and the minimum value of the output signals obtained during the determination period t falls within 2×Vn.

In short, even when the outer pressure Pout reaches a constant pressure after having changed, the output signal keeps changing (corresponding to the period C in FIG. 5(B)). This is because the period is at least equal to or longer than the time constant $\tau$, and hence a time period at least equal to or longer than the determination period $\tau$ is necessary in order to determine a condition that the outer pressure Pout is constant without changing and that the pressure difference $\Delta P$ is around zero. This is also because, in an actual case, the output signal is output with electric noise Vn having a given fixed width being added, which needs to be taken into consideration to set the predetermined range of the output signal.

Subsequently, when the determination unit 61 determines that the change in output signal described above falls out of the predetermined range (Step S903; N), the processing of Steps S901 to S903 is conducted repeatedly.

Meanwhile, when determining that the Nr values of the output signal described above fall within the predetermined range (Step S903; Y), the determination unit 61 calculates the reference value (Step S904). In this case, the determination unit 61 calculates, for example, an average value of the output signals during the determination period (Nr×$\Delta tr$) as the reference value.

As described above, the output signal for this case is obtained by adding the signal that changes depending on the change in outer pressure Pout and the reference value (voltage), which is a voltage obtained when the pressure difference $\Delta P$ between the outer pressure Pout and the inner pressure Pin is zero. That is, it is conceivable that, when the distribution of Nr output signals falls within the predetermined range, the change in outer pressure Pout is so small that the above-mentioned output signal is approximately around the reference value, and the reference value is set in the processing of Step S904 through use of such a phenomenon.

Subsequently, the reference value setting unit 60 outputs the reference value calculated in Step S904 and the Nr values of the output signal during the determination period (Nr×$\Delta tr$) to the arithmetic processing unit 30 (Step S905).

Then, the arithmetic processing unit 30 conducts interrupt processing. Specifically, the arithmetic processing unit 30 uses the received Nr values of the output signal and the reference value to conduct processing that is approximately equivalent to the processing for calculating the change in outer pressure Pout, which is described in the section (Processing for Calculating Change in Outer Pressure Pout by Arithmetic Processing Unit) (see Step S704 of FIG. 7 to Step S713 of FIG. 8). Finally, the arithmetic processing unit 30 outputs Nr pieces of information relating to the outer pressure Pout calculated in the processing equivalent to Step S713 to the reference value setting unit 60 (Step S906).

After that, the determination unit 61 determines based on the received Nr pieces of information on the outer pressure Pout whether or not the Nr pieces of information on the outer pressure Pout for every time period $\Delta tr$ falls within the predetermined range (Step S907). For example, the determination unit 61 calculates a first-order approximation equation for a plot of the information on the outer pressure Pout with respect to a time axis, and when a gradient of the approximation equation is equal to or smaller than $\frac{1}{12}\tau$ (m/sec), determines that the information falls within the predetermined range. Step S907 has an object to verify whether or not the reference value calculated in Step S904 is accurate.

When the reference value is accurate and the pressure difference $\Delta P$ is approximately zero, the outer pressure Pout to be obtained is assumed to take a fixed value with respect to the time axis. Meanwhile, when the reference value is not accurate, the outer pressure Pout exhibits a fixed inclination with respect to the time axis. In short, an inaccurate reference value is a value obtained by adding the accurate reference value and an error, and when the outer pressure Pout is calculated based on the inaccurate reference value, accumulation of the error is reflected in the outer pressure Pout, which causes the outer pressure Pout with respect to the time axis to exhibit a fixed inclination.

When determining that the information falls out of the above-mentioned predetermined range (Step S907; N), the determination unit 61 conducts correction processing for the calculated reference value, and updates the calculated reference value to the corrected reference value (Step S908). As described above, there is a relationship between the error of the reference value and the gradient of the outer pressure Pout with respect to the time axis. Therefore, for example, it is possible to conduct correction processing for updating, as the corrected reference value, a value obtained by subtracting a numerical value calculated in accordance with the gradient of the above-mentioned approximation equation from the reference value calculated in Step S904.

Meanwhile, when determining that the above-mentioned Nr pieces of information relating to a position in a vertical direction falls within the predetermined range (Step S907; Y), or after the processing of Step S908 is finished, the determination unit 61 generates a reference value signal from the reference value, and outputs the reference value signal to the arithmetic processing unit 30 (Step S909) to bring the processing to an end.

After that, the arithmetic processing unit 30 stores the reference value in the storage device of the arithmetic processing unit 30 based on the received reference value signal, and refers to this value next time the reference value is necessary.

With the above-mentioned configuration, the reference value setting unit 60 can calculate the reference value based on the output signal of the detection circuit 22, and set the reference value after judging whether or not the calculated reference value is correct.

This allows the accurate reference value to be set, and hence it is possible to measure an accurate change in outer pressure Pout.

1-6: "Modification Example 1" Offset Adjustment for Resistor and Amplifier of Bridge with Reference Value Signal The description has been made of the flow of the processing for outputting the reference value signal to the arithmetic processing unit 30 by the reference value setting unit 60 according to the first embodiment.

In this case, as in this modification example, there may be provided a configuration for controlling the output characteristic of the detection circuit 22 after the reference value setting unit 60 generates the reference value signal.

Figure 10:
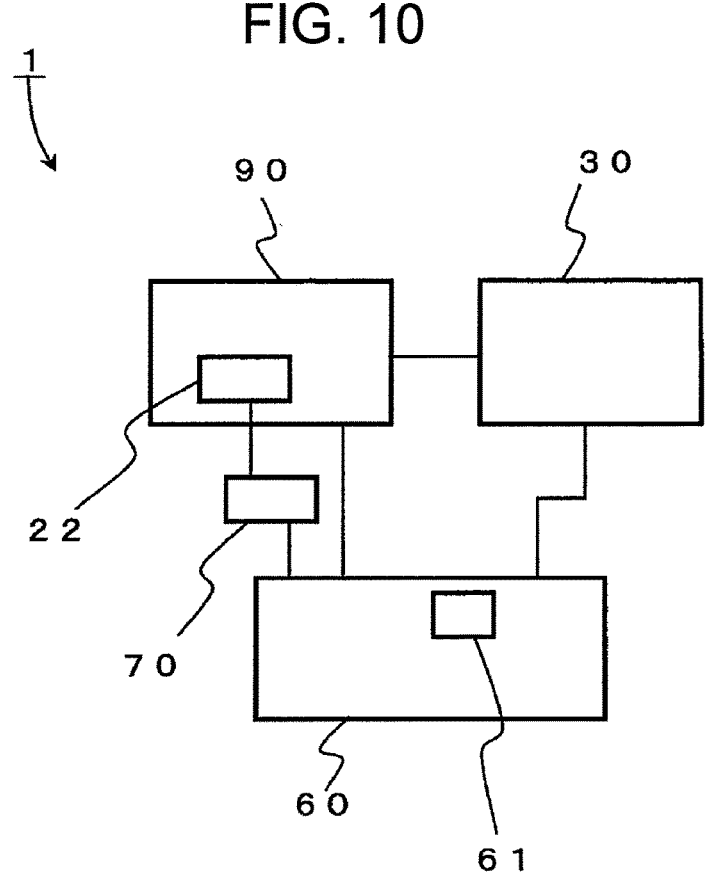
FIG. 10 is a configuration diagram for illustrating a pressure change measuring apparatus according to a modification example of the first embodiment.

Now, a configuration of the pressure change measuring apparatus 1 according to this modification example is illustrated in FIG. 10. In the pressure change measuring apparatus 1 according to this modification example, an adjustment circuit 70 is provided between the reference value setting unit 60 and the detection circuit 22 of the pressure change measuring apparatus 1 according to the first embodiment.

When receiving the reference value signal output from the reference value setting unit 60, the adjustment circuit 70 generates an adjustment signal based on the reference value signal, and outputs the adjustment signal to the detection circuit 22. The adjustment signal represents a signal for conducting control to adjust an output characteristic of the detection circuit 22 so that the output signal becomes a specified voltage when the pressure difference DP is zero. The detection circuit 22, which has received the adjustment signal, adjusts the output signal of the detection circuit 22 by the adjustment signal generated based on the reference value signal.

Specifically, the adjustment of the output signal represents, for example, processing for configuring a variable resistor Ro' of the detection circuit 22 by a programmable variable resistor, and changing the electric resistance value based on the received adjustment signal or inputting the adjustment signal to the amplifier circuit 22a, to thereby adjust an offset for the output of the amplifier circuit 22a.

With this configuration, the output signal is adjusted by the adjustment signal generated based on the reference value signal, to thereby be able to adjust the value of the output signal to the specified voltage when the pressure difference ΔP is approximately zero.

Second Embodiment

The pressure change measuring apparatus 1 according to a second embodiment of the present invention is described with reference to FIG. 11. The same components as those of the pressure change measuring apparatus according to the first embodiment described above are denoted by like names and like reference symbols, and descriptions thereof are omitted.

2-1: Overall Configuration

The pressure change measuring apparatus 1 according to the second embodiment is different from the pressure change measuring apparatus 1 according to the first embodiment in that the reference value setting unit 60 included in the pressure change measuring apparatus 1 includes the determination unit 61, a detection unit 62, and a storage device (not shown).

The detection unit 62 includes a sensor or a detector configured to detect presence or absence of the change in outer pressure Pout. In the same manner as in the first embodiment, the determination unit 61 has a function of calculating the reference value from the output signal of the detection circuit 22, updating the reference value, and generating the reference value signal.

The sensor or detector included in the detection unit 62 has two types.

One type is to directly detect that the outer pressure Pout has changed, and the other is to detect that the pressure change measuring apparatus is exhibiting a vertical motion to estimate the change in outer pressure Pout due to the vertical motion. This is because, when the pressure change measuring apparatus is used under a state in which a gravitational acceleration is applied, an atmospheric pressure, a hydraulic pressure, or the like is associated with a position in a gravitational acceleration direction, and a pressure around the apparatus changes due to a change in position in the gravitational acceleration direction (vertical position).

First, a description is made of a configuration for directly detecting that the outer pressure Pout has changed. The detection unit 62 is, for example, an absolute pressure sensor or a flow rate sensor provided between a top portion of the cantilever and the outside. It is possible to roughly grasp accuracy in measurement of the pressure change based on each of outputs of those sensors, and hence it is possible to determine the presence or absence of the change in outer pressure Pout around the pressure change measuring apparatus 1.

Figure 11:
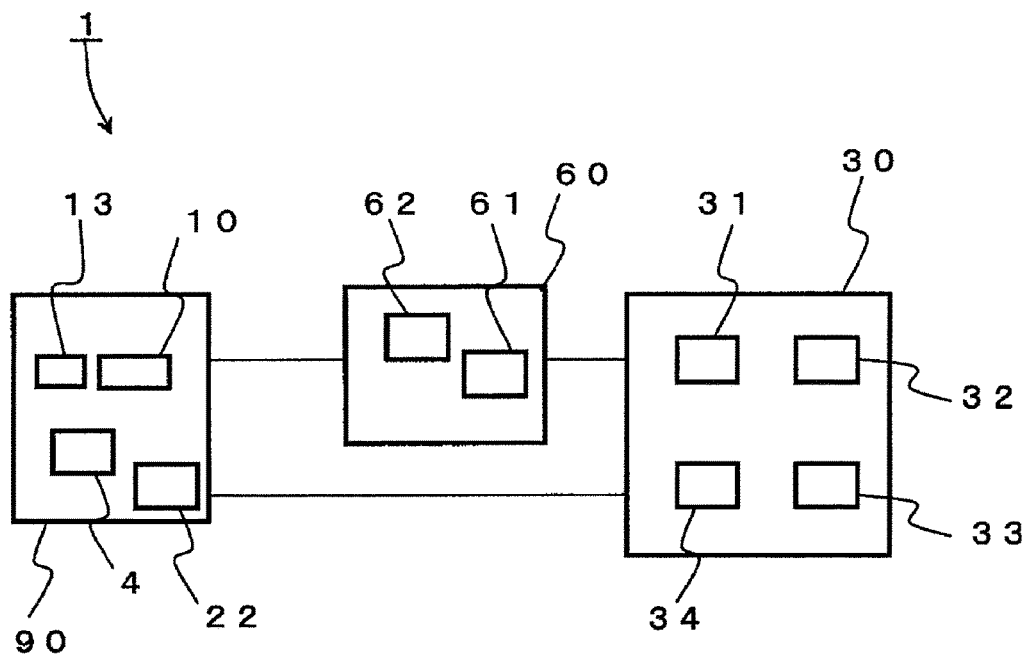
FIG. 11 is a configuration diagram for illustrating a pressure change measuring apparatus according to a second embodiment of the present invention.
Figure 12:
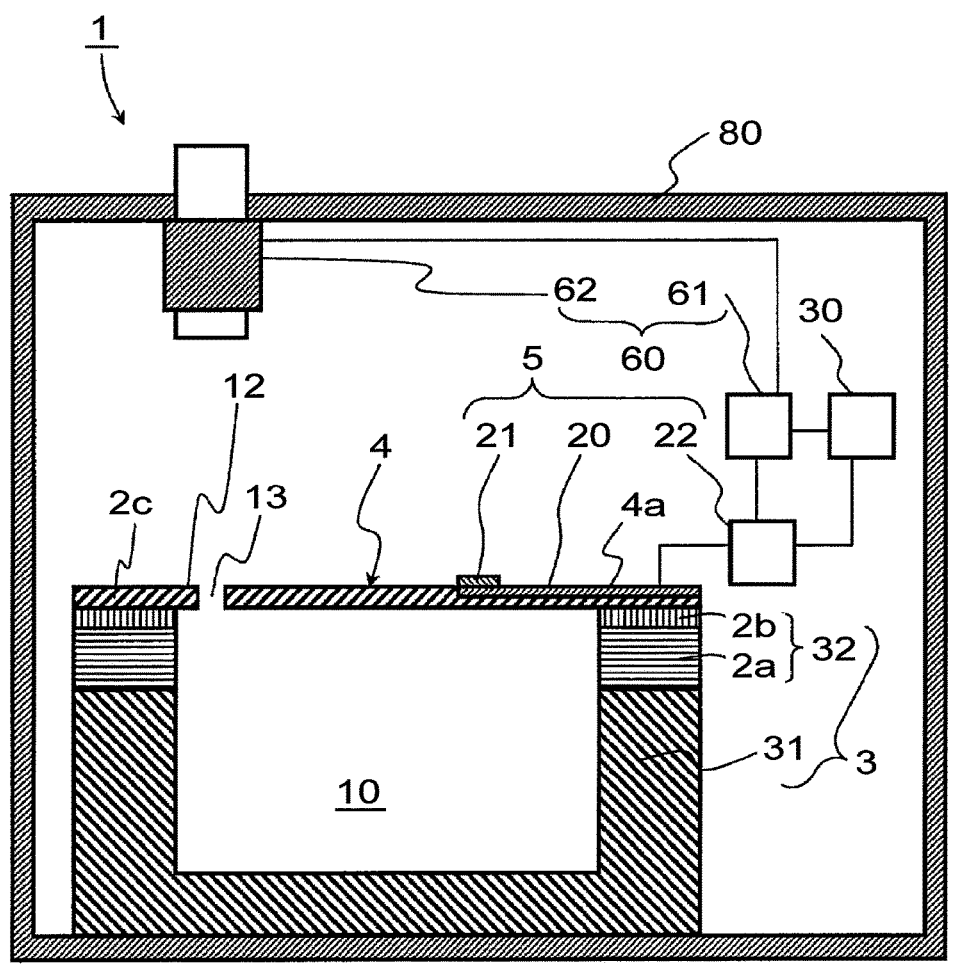
FIG. 12 is a configuration diagram for illustrating the pressure change measuring apparatus according to the second embodiment.

A configuration example in which the absolute pressure sensor is used as the detection unit 62 is illustrated in FIG. 11, while a configuration example in which the flow rate sensor is used is illustrated in FIG. 12. A casing 80 with an air hole is provided between the cantilever 4 and the pressure to be measured, and the flow rate sensor formed of the detection unit 62 is provided to the air hole. When there is a change in pressure to be measured outside the casing 80 with the air hole, the pressure inside the casing 80 with the air hole changes in conjunction with the outside pressure.

At this time, the pressure transmission medium moves into and out of the casing 80 with the air hole through the air hole. When there is no change in pressure to be measured, the pressure transmission medium does not move through the air hole. Therefore, it is possible to determine the presence or absence of the change in outer pressure Pout by detecting whether or not the pressure transmission medium is moving through the air hole. In view of the foregoing, when a flow velocity or a flow rate of the pressure transmission medium moving through the air hole is detected by the flow rate sensor, it is possible to capture a moment at which the outer pressure Pout is exhibiting no change, and to generate the reference value signal by calculating the reference value from the output signal of the detection circuit 22 obtained at that time.

Next, a description is made of such a configuration that the pressure change measuring apparatus 1 detects that the position in the gravitational acceleration direction (vertical direction) has changed to estimate the presence or absence of the outer pressure Pout. The sensor or detector formed of the detection unit 62 is, for example, an acceleration sensor, an angular velocity sensor, a magnetic sensor, an absolute pressure sensor, or a GPS. That is, the determination unit 61 can roughly grasp the movement of the position in the vertical direction based on each of outputs of those sensors and the system, and hence it is possible to determine the presence or absence of the change in outer pressure Pout corresponding to a motion (movement) of the pressure change measuring apparatus 1.

2-2: Reference Value Generation Processing of Reference Value Setting Unit

Figure 13:
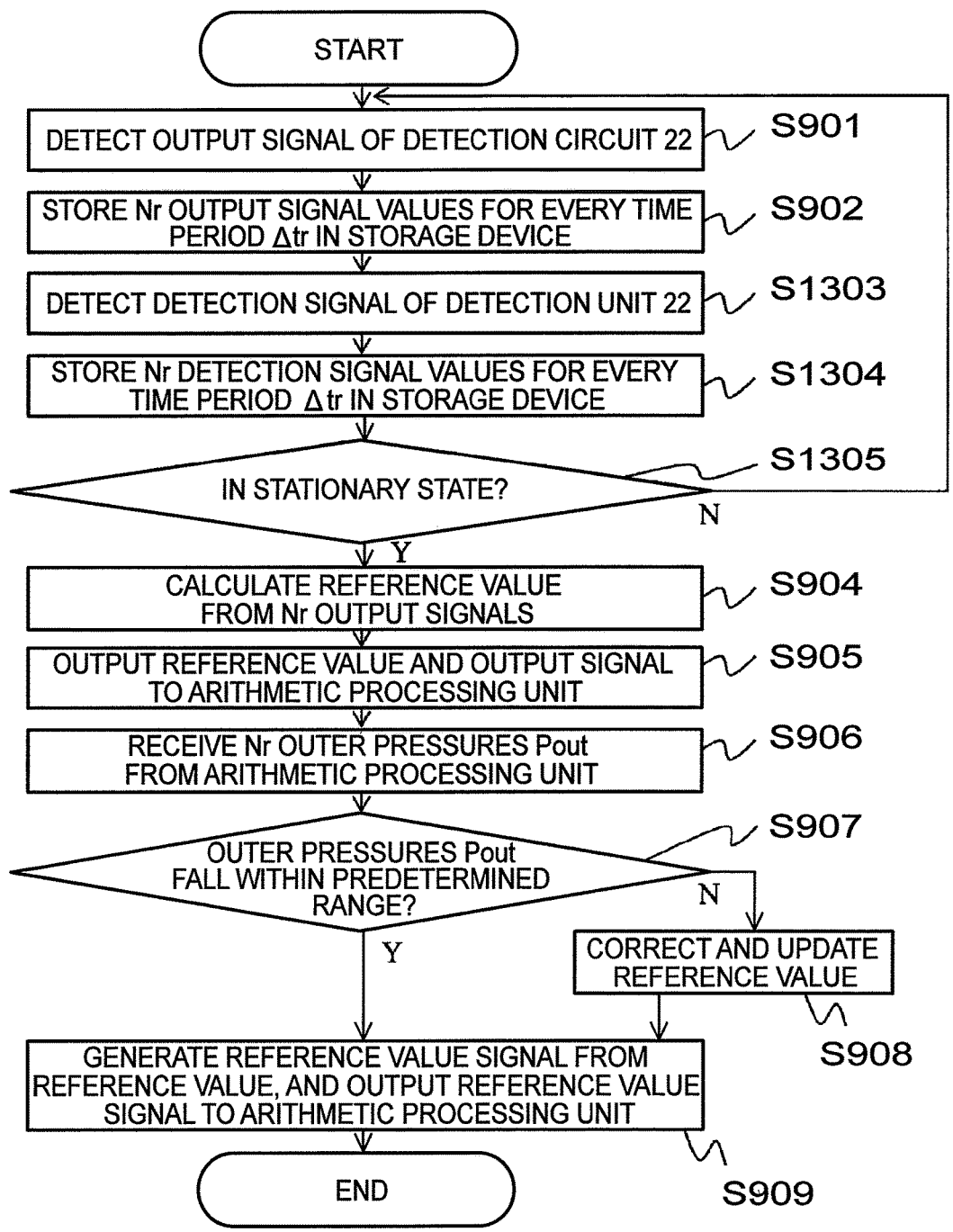
FIG. 13 is a flowchart for illustrating a flow of processing of a reference value setting unit included in the pressure change measuring apparatus according to the second embodiment.

Reference value generation processing of the reference value measuring unit 60 which involves the estimation of the outer pressure Pout based on the detection of the vertical motion according to the second embodiment is described with reference to FIG. 13 by focusing on a difference from the flowchart illustrated in FIG. 9. FIG. 13 is a flowchart for illustrating a flow of processing conducted until the reference value measuring unit 60 generates the reference value signal.

First, the reference value setting unit 60 detects the output signal of the detection circuit 22 (Step S901), stores the output signal in the storage device (Step S902), then detects a detection signal of the detection unit 62 (Step S1303), and stores Nr detection signals in the storage device for every time period Δtr (Step S1304).

Subsequently, the determination unit 61 determines based on the detection signal of the detection unit 62 whether or not the pressure change measuring apparatus 1 is in a stationary state, namely, a state in which there is no movement of the position. In this case, the detection unit 62 is formed of an inertia sensor, e.g., an acceleration sensor, or a positioning system, e.g., a GPS, and it is possible to detect the movement of the position. As a determination condition, for example, when the detection unit 62 is formed of an acceleration sensor, and when the output signal of the acceleration sensor being the detection signal falls within a range of 1±0.02 G, it is determined that the pressure change measuring apparatus 1 is in the stationary state.

When the determination unit 61 determines based on the above-mentioned detection signal that the pressure change measuring apparatus 1 is not in the stationary state (Step S1305; N), the processing of Steps S901 to S1305 is conducted repeatedly.

Meanwhile, when determining based on the above-mentioned detection signal that the pressure change measuring apparatus 1 is in the stationary state (Step S1305; Y), the determination unit 61 executes the processing of Steps S904 to S909 in the same manner as in the first embodiment.

With this configuration, it is possible to detect the presence or absence of the change in outer pressure Pout based on not only the output signal of the detection circuit but also the information from another sensor or the detector, and hence the accurate reference value can be set. Therefore, the minute pressure difference ΔP can be measured, and the change in outer pressure Pout can be measured with high accuracy.

2-3: "Modification Example 2"

In the second embodiment, the configuration for detecting the presence or absence of the change in outer pressure Pout around the apparatus based on a positional change in the gravitational acceleration direction (vertical direction) is described as an example. When the pressure change measuring apparatus is used under a state in which the change in outer pressure Pout is caused mainly by the movement of the position in the vertical direction, it is also possible to use the pressure change measuring apparatus 1 as an apparatus configured to detect the positional change in the vertical direction.

As in this modification example, when the change in position of the vehicle in the vertical direction is detected through use of the pressure change measuring apparatus 1, the detection unit 62 does not need to be the above-mentioned inertia sensor or positioning system.

That is, it is possible to determine the state in which a vehicle is not moving in the vertical direction based on not only inertia but also whether or not wheels are kept from moving or whether or not a power source is in a stopped state. For example, when the pressure change measuring apparatus 1 is mounted to an automobile or the like to detect the positional change in the vertical direction, a vehicle speed pulse that can be detected from a main body of the automobile can be used as the detection signal of the detection unit 62. When the vehicle speed pulse fails to be detected, the determination unit 61 can determine that the automobile to which the pressure change measuring apparatus 1 is mounted is not moving and that the pressure change measuring apparatus 1 is in the stationary state.

In this manner, the vehicle speed sensor, a crank shaft sensor, a parking brake sensor or switch, or the like is used as the sensor that forms the detection unit 62 when the pressure change measuring apparatus 1 is mounted to the automobile or the like to detect the positional change in the vertical direction, and a speedometer, a cadence sensor, or the like is used as the sensor that forms the detection unit 62 when the pressure change measuring apparatus 1 is mounted to a bicycle, to thereby be able to determine the stationary state.

In addition, the reference value setting unit 60 can set the reference value through use of positional information in the vertical direction included in map information of a car navigation system or the like. For example, the reference value setting unit 60 stores a course locus in advance, and sets the reference value so that a position of a point in the vertical direction, which does not involve an elevated road or other such spot at a different position in the vertical direction in a surrounding area, matches a position in the vertical direction obtained when the same point is passed again after a lapse of time, to thereby be able to set the accurate reference value.

Third Embodiment

Figure 14:
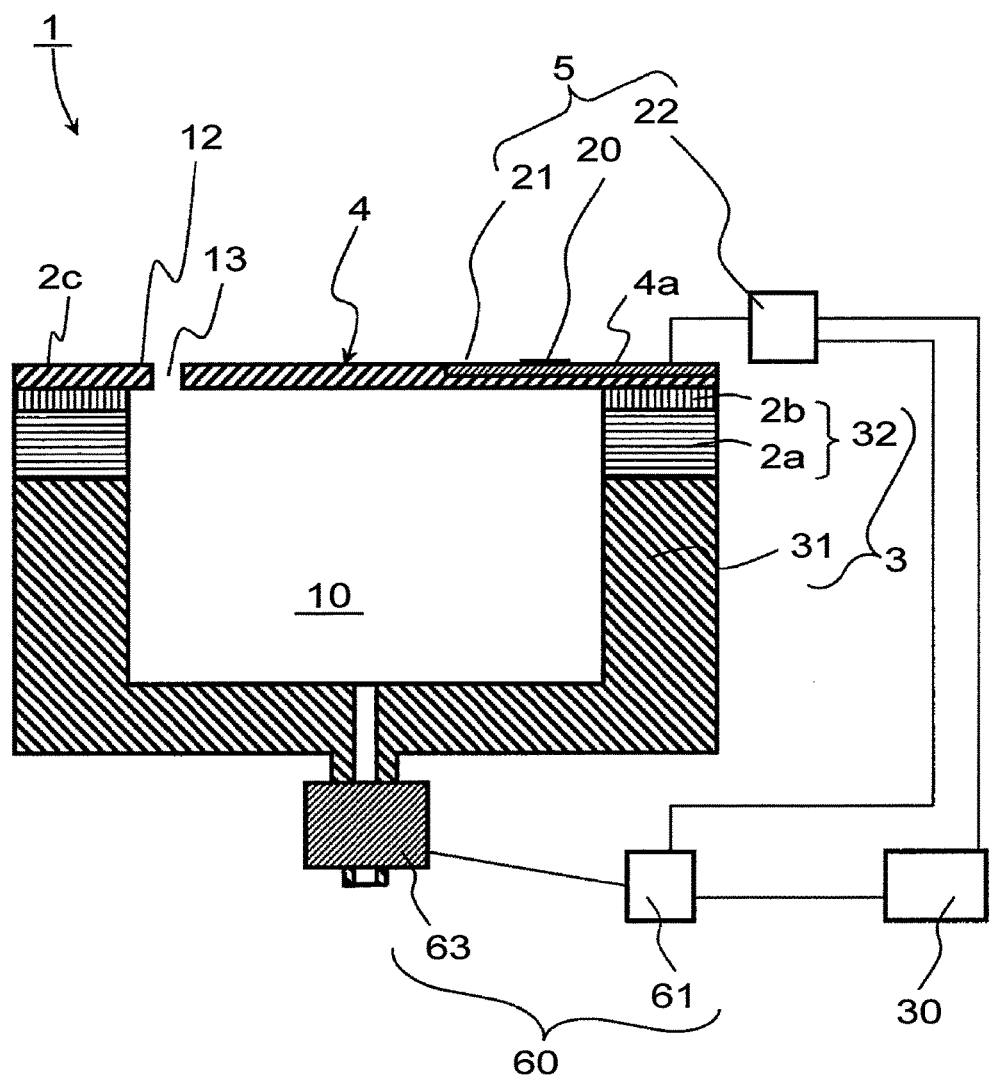
FIG. 14 is a sectional view for illustrating cross-sectional structure of a pressure change measuring apparatus according to a third embodiment of the present invention.

The pressure change measuring apparatus 1 according to a third embodiment of the present invention is described with reference to FIG. 14. The same components as those of the pressure change measuring apparatus according to the first and second embodiments described above are denoted by like names and like reference symbols, and descriptions thereof are omitted.

3-1: Overall Configuration

The pressure change measuring apparatus 1 according to the third embodiment is different from the pressure change measuring apparatus 1 according to the first and second embodiments in that the reference value setting unit 60 includes the determination unit 61, a pressure adjusting unit 63, and a storage device (not shown). Further, the determination unit 61 is assumed to be connected to a user interface (not shown) for receiving an instruction to set the reference value from the user. In addition, the pressure adjusting unit 63 illustrated in FIG. 14 is a valve provided between the cavity 10 of the differential pressure measuring cantilever 4 and the outside, which is capable of controlling the opening and closing of the air hole.

3-2: Reference Value Generation Processing of Reference Value Setting Unit

Figure 15:
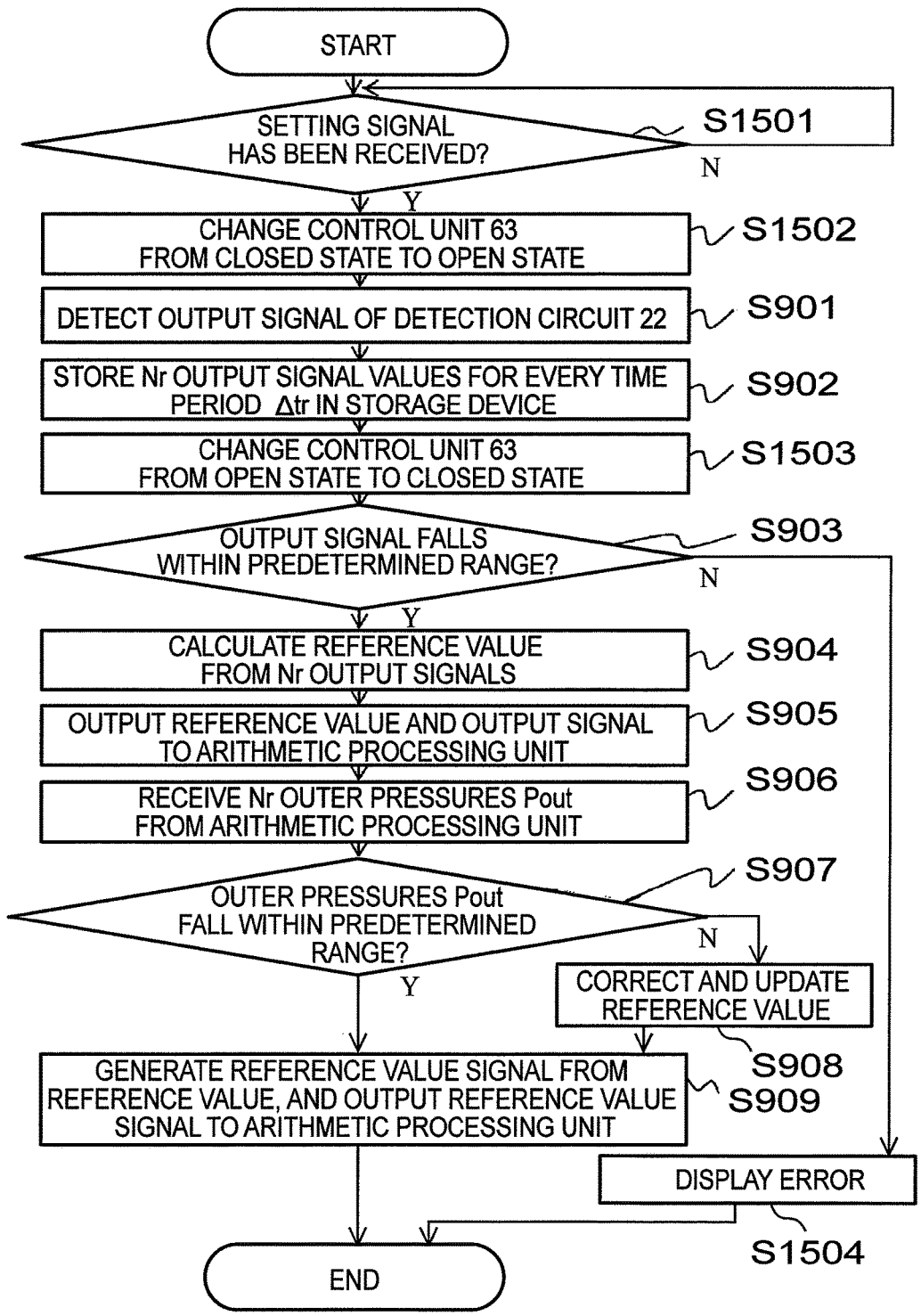
FIG. 15 is a flowchart for illustrating a flow of processing of a reference value setting unit included in the pressure change measuring apparatus according to the third embodiment.

Reference value generation processing of the reference value measuring unit 60 according to the third embodiment is described with reference to FIG. 15 by focusing on a difference from the flowchart illustrated in FIG. 9. FIG. 15 is a flowchart for illustrating a flow of processing conducted until the reference value measuring unit 60 generates the reference value signal.

First, the determination unit 61 stands by until a setting signal indicating the instruction to set the reference value is received from the connected user interface (Step S1501). When receiving the setting signal (Step S1501; Y), the determination unit 61 changes the pressure adjusting unit 63 (valve) from a closed state to an open state (Step S1502). Then, the air hole between the cavity 10 and outdoor air is opened, and the pressure transmission medium flows through the air hole, to thereby equalize the inner pressure Pin of the cavity 10 and the outer pressure Pout.

Subsequently, the reference value setting unit 60 detects the output signal of the detection circuit 22 (Step S901), and stores the output signal in the storage device (Step S902). That is, an output signal value obtained here indicates an output signal under a state in which the inner pressure Pin and the outer pressure Pout are equal to each other, namely, the pressure difference ΔP is approximately zero.

Subsequently, the determination unit 61 changes the pressure adjusting unit 63 from the open state to the closed state (Step S1503). With this change, only the gap 13 or the through hole 15 provided around the differential pressure measuring cantilever 4 communicates between the inside of the cavity 10 and the outdoor air, which restricts the flowing of the pressure transmission medium. Therefore, the inner pressure Pin follows the outer pressure Pout with a delay, to thereby cause the pressure difference ΔP.

Subsequently, the determination unit 61 of the reference value setting unit 60 determines whether or not the change in output signal falls within a predetermined range (Step S903). In this case, the determination unit 61 determines whether or not the output signal has been acquired in an abnormal state. When determining that an abnormal value exceeding the predetermined range is included (Step S903; N), the determination unit 61 conducts display indicating an error through the user interface (Step S1504), and brings the processing to an end.

Meanwhile, when determining that the output signal falls within the predetermined range (Step S903; Y), the determination unit 61 executes the processing of Steps S904 to S909.

This configuration allows the user to conduct an operation for setting the reference value by selecting a period other than a time period for measuring the position in the vertical direction. Further, a state in which the pressure difference ΔP is zero can be created intentionally, and hence it is possible to set the accurate reference value, and to measure the change in outer pressure Pout with high accuracy.

The pressure adjusting unit 63 is not limited to the valve provided to the cavity casing 3. A configuration example of the pressure change measuring apparatus 1 that does not use the valve is illustrated in FIG. 16.

Figure 16:
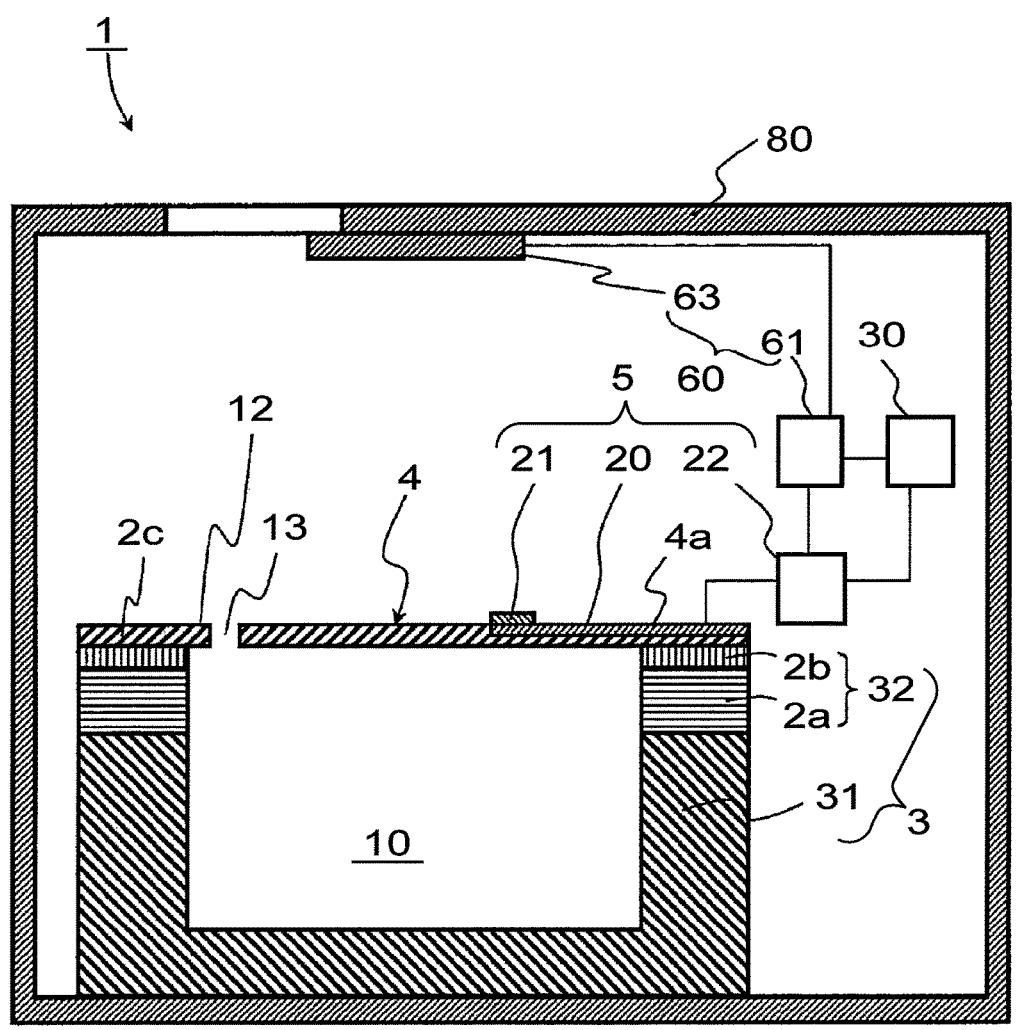
FIG. 16 is a sectional view for illustrating cross-sectional structure of the pressure change measuring apparatus according to the third embodiment.

The casing 80 with the air hole illustrated in FIG. 16 receives all the cavity casing 3 and the differential pressure measuring cantilever 4 in the inside, and includes an air hole for exchanging air with the outside, which is provided to a part of the casing 80 with the air hole. The air hole is provided with a shutter for controlling the opening and closing of the air hole. The shutter has a function of controlling interruption and transmission between the outer pressure Pout applied to the differential pressure measuring cantilever 4 and the pressure outside the casing 80 with the air hole, and functions as the pressure adjusting unit 63. In short, when the determination unit 61 brings the shutter to a closed state, the pressure change inside the casing 80 with the air hole is fixed, and the outer pressure Pout and the inner pressure Pin gradually become equal to each other, with the result that the pressure difference ΔP becomes zero.

The determination unit 61 brings the shutter to the closed state, and conducts the reference value generation processing illustrated in FIG. 9 after a lapse of a predetermined waiting time, to thereby be able to accurately set the reference value.

Even immediately after the opening and closing of the pressure adjusting unit 63 of the valve is controlled, the inner pressure Pin may cause the change in pressure due to opening-and-closing actions of the pressure control unit 63. Even in such a case, it is possible to accurately set the reference value by providing a waiting time between the control of the opening and closing and the detection of the output signal (between Steps S1402 and S901).

3-3: "Modification Example 3"

The configuration of the pressure change measuring apparatus 1 using the differential pressure measuring cantilever 4 has been described, but as in this modification example, it is possible to configure the pressure change measuring apparatus 1 without using the above-mentioned differential pressure measuring cantilever 4 in order to measure the pressure difference ΔP between the outer pressure Pout and the inner pressure Pin of the inside of the cavity.

Figure 17:
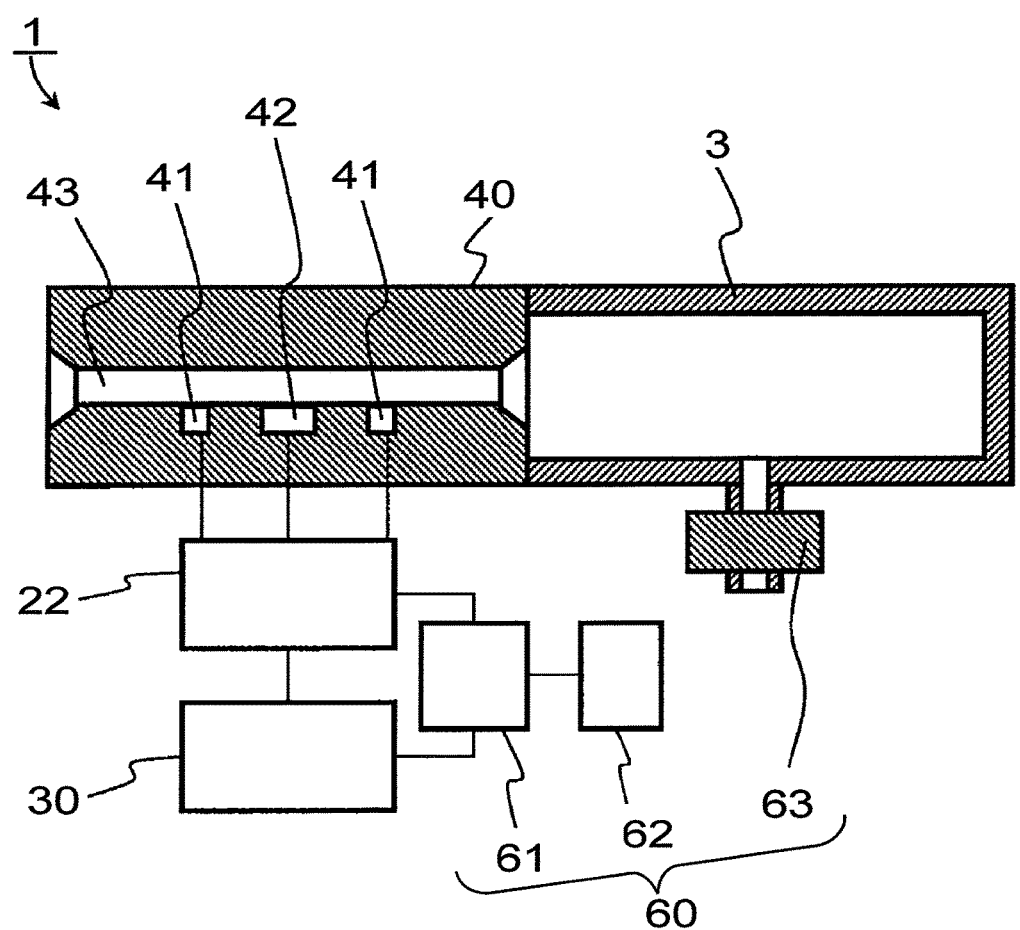
FIG. 17 is a sectional view for illustrating cross-sectional structure of a pressure change measuring apparatus according to a modification example of the third embodiment.

In this case, a configuration of the pressure change measuring apparatus 1 according to this modification example is illustrated in FIG. 17. Specifically, the pressure change measuring apparatus 1 includes the thermal type differential pressure gauge 40, the cavity casing 3 provided on one end of the thermal type differential pressure gauge 40, the arithmetic processing unit 30 connected to the detection circuit 22 of the thermal type differential pressure gauge 40, and the reference value setting unit 60 connected to the detection circuit 22 and the arithmetic processing unit 30.

The reference value setting unit 60 includes the determination unit 61 connected to the detection circuit 22 and the arithmetic processing unit 30, the detection unit 62 connected to the determination unit 61 and configured to detect the stationary state of the pressure change measuring apparatus 1, and the pressure adjusting unit 63 being a valve provided in order to control the opening and closing of the air hole configured to communicate between the inside and outside of the cavity casing 3.

The thermal type differential pressure gauge 40 generally includes a pair of temperature sensors 41 provided inside a fine flow channel 43 and a heater 42 (heat source) arranged in a position with equal distances from the respective temperature sensors 41, and is formed of a passage shape in which the communication hole communicates to/from an opening portion of the cavity casing 3. In the thermal type differential pressure gauge 40, when the heater 42 is generating heat, the pressure transmission medium inside the flow channel 43 is heated. When the pressure transmission medium is stopped in the thermal type differential pressure gauge 40, heat is spread around the heater 42, and a temperature distribution having a bilateral symmetry is obtained inside the flow channel 43. In this case, the same output value is obtained from the respective temperature sensors 41.

When the pressure difference occurs on both ends of the flow channel 43, the pressure transmission medium flows from one end of the flow channel 43 on the high-pressure side to the other end of the flow channel 43 on the low-pressure side. The temperature distribution inside the flow channel 43 exhibited at this time is biased toward a downstream side, and hence the temperature becomes lower on an upstream side and becomes higher on the downstream side.

Therefore, the output value of the temperature sensor 41 on the downstream side becomes larger. Hence, in the thermal type differential pressure gauge 40, a flow velocity of the pressure transmission medium is obtained from a difference between the output values of the temperature sensor 41 on the upstream side and the downstream side at this time, and hence the pressure difference between both ends of the flow channel 43 can be measured from the flow velocity.

Therefore, in the pressure change measuring apparatus 1 including the thermal type differential pressure gauge 40, the arithmetic processing unit 30 can measure the change in outer pressure Pout through use of the output signal obtained from the detection circuit 22 of the thermal type differential pressure gauge 40 and a reference value setting signal received from the reference value setting unit 60.

3-4: Reference Value Generation Processing of Reference Value Setting Unit

Figure 18:
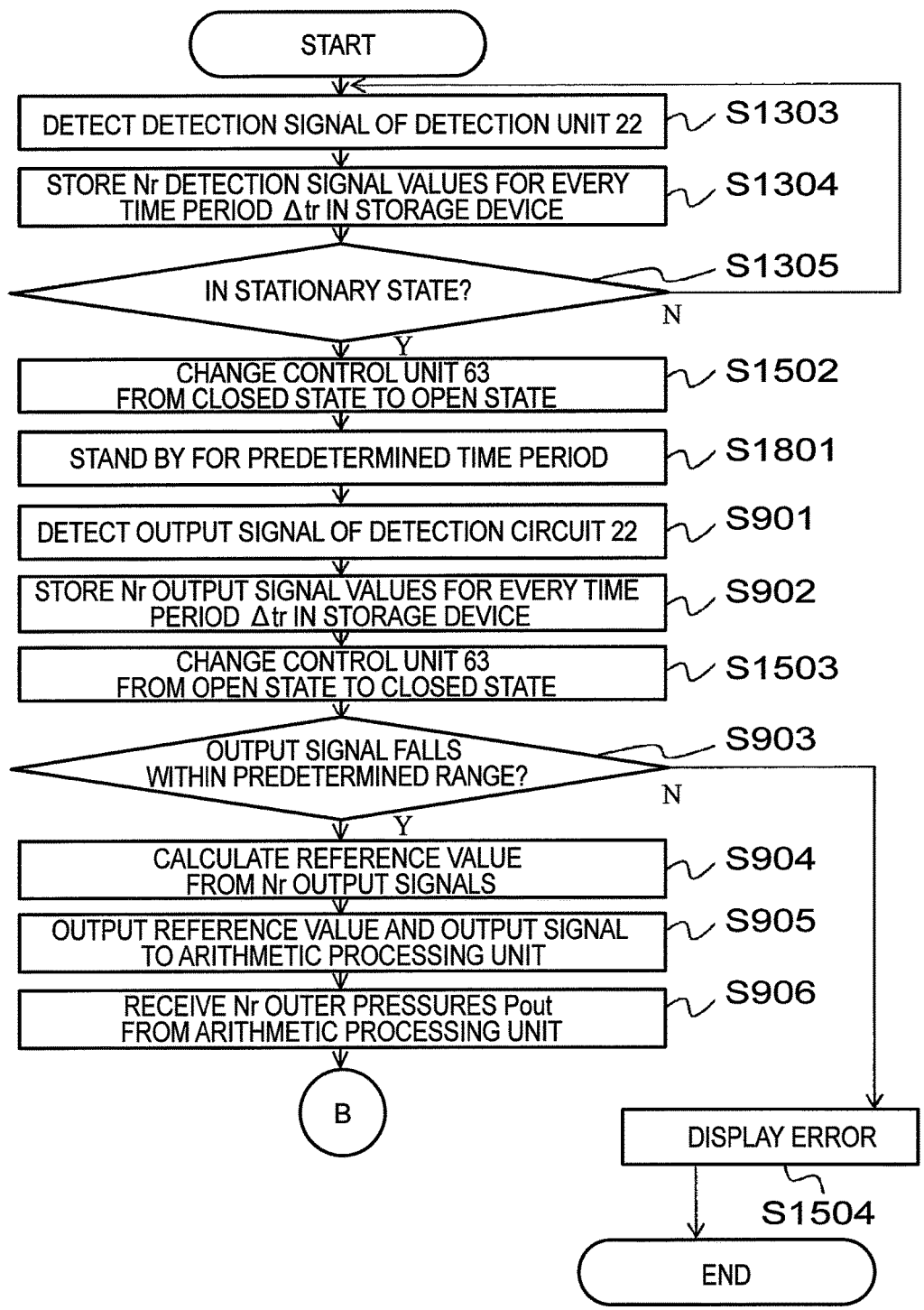
FIG. 18 is a flowchart for illustrating a flow of processing of a reference value setting unit included in the pressure change measuring apparatus according to the modification example of the third embodiment.
Figure 19:
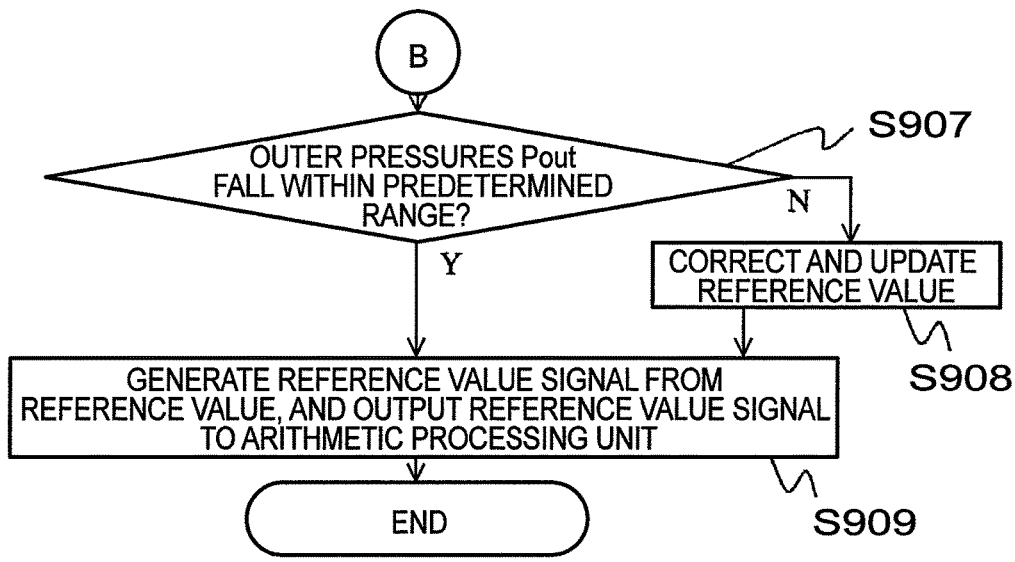
FIG. 19 is a flowchart for illustrating a flow of processing of the reference value setting unit included in the pressure change measuring apparatus according to the modification example of the third embodiment.

Next, a flow of processing of the reference value setting unit 60 is described with reference to FIG. 18 and FIG. 19.

First, the reference value setting unit 60 detects the detection signal of the detection unit 62 (Step S1303), and stores Nr pieces of information relating to the detection signal in the storage device for every time period $\Delta$tr (Step S1304). Then, the determination unit 61 uses the detection signal to determine whether or not the pressure change measuring apparatus 1 is in a stationary state, namely, a state in which there is no particular change in position in the vertical direction (Step S1305).

When the determination unit 61 determines in Step S1305 that the pressure change measuring apparatus 1 is not in the stationary state (Step S1305; N), the processing of Steps S1303 to S1305 is conducted repeatedly.

Meanwhile, when determining in Step S1305 that the pressure change measuring apparatus 1 is in the stationary state (Step S1305; Y), the determination unit 61 changes the pressure adjusting unit 63 from the closed state to the open state (Step S1502). Then, there is a change in inner pressure Pin inside the cavity 10 due to the action of the control unit 63, and hence the determination unit 61 stands by for a predetermined time period until the pressure difference $\Delta$P positively becomes zero (Step S1801).

Subsequently, the determination unit 61 detects the output signal of the detection circuit 22 (Step S901), stores the output signal in the storage device (Step S902), and then changes the pressure adjusting unit 63 from the open state to the closed state (Step S1503).

Subsequently, the determination unit 61 of the reference value setting unit 60 determines whether or not the change in output signal falls within the predetermined range (Step S903). In this case, the determination unit 61 determines whether or not the output signal has been acquired in the abnormal state. When determining that the abnormal value exceeding the predetermined range is included (Step S903; N), the determination unit 61 conducts the display indicating an error (Step S1504), and brings the processing to an end.

Meanwhile, when determining that the output signal falls within the predetermined range (Step S903; Y), the determination unit 61 executes the processing of Steps S904 to S909.

With this configuration, it is possible to intentionally create the state in which the pressure difference $\Delta$P is zero by detecting the state in which there is no change in position of the pressure change measuring apparatus 1 in the vertical direction, and to set the accurate reference value. Therefore, it is possible to measure the change in outer pressure Pout with high accuracy.

Fourth Embodiment

Figure 20:
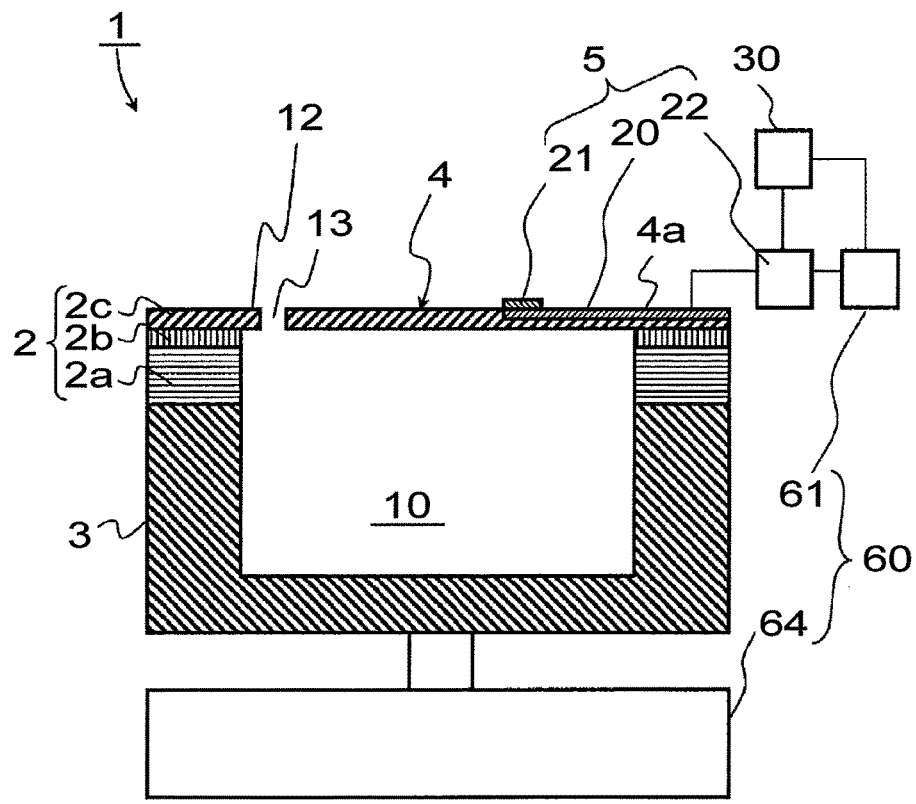
FIG. 20 is a sectional view for illustrating cross-sectional structure of a pressure change measuring apparatus according to a fourth embodiment of the present invention.

The pressure change measuring apparatus 1 according to a fourth embodiment of the present invention is described with reference to FIG. 20. The same components as those of the pressure change measuring apparatus according to any of the first to third embodiments described above are denoted by like names and like reference symbols, and descriptions thereof are omitted.

4-1: Overall Configuration

The pressure change measuring apparatus 1 according to the fourth embodiment is different from the pressure change measuring apparatus 1 according to any one of the first to third embodiments in that the reference value setting unit 60 includes the determination unit 61, a differential pressure control unit 64, and a storage device (not shown). Further, the determination unit 61 is assumed to be connected to a user interface (not shown) for receiving an instruction to set the reference value from the user. In addition, the differential pressure control unit 64 illustrated in FIG. 20 is a direct-acting actuator connected to the cavity casing 3 and configured to vibrate the cavity casing 3 and the differential pressure measuring cantilever 4 in the vertical direction.

4-2: Reference Value Generation Processing of Reference Value Setting Unit

Figure 21:
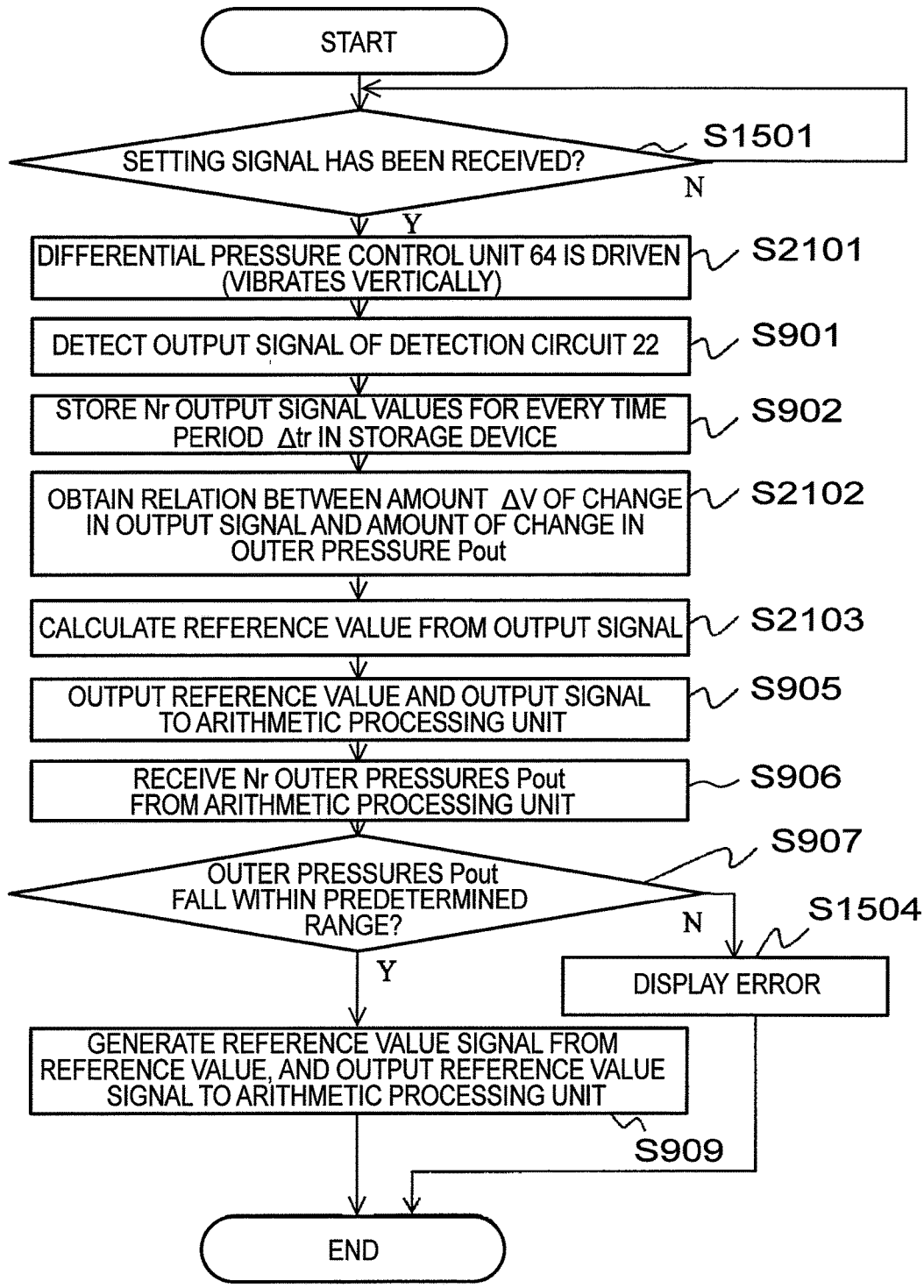
FIG. 21 is a flowchart for illustrating a flow of processing of a reference value setting unit included in the pressure change measuring apparatus according to the fourth embodiment.

Reference value generation processing of the reference value measuring unit 60 according to the fourth embodiment is described with reference to FIG. 21 by focusing on a difference from the flowchart illustrated in FIG. 9. FIG. 21 is a flowchart for illustrating a flow of processing conducted until the reference value measuring unit 60 according to the fourth embodiment generates the reference value signal.

Figure 22:
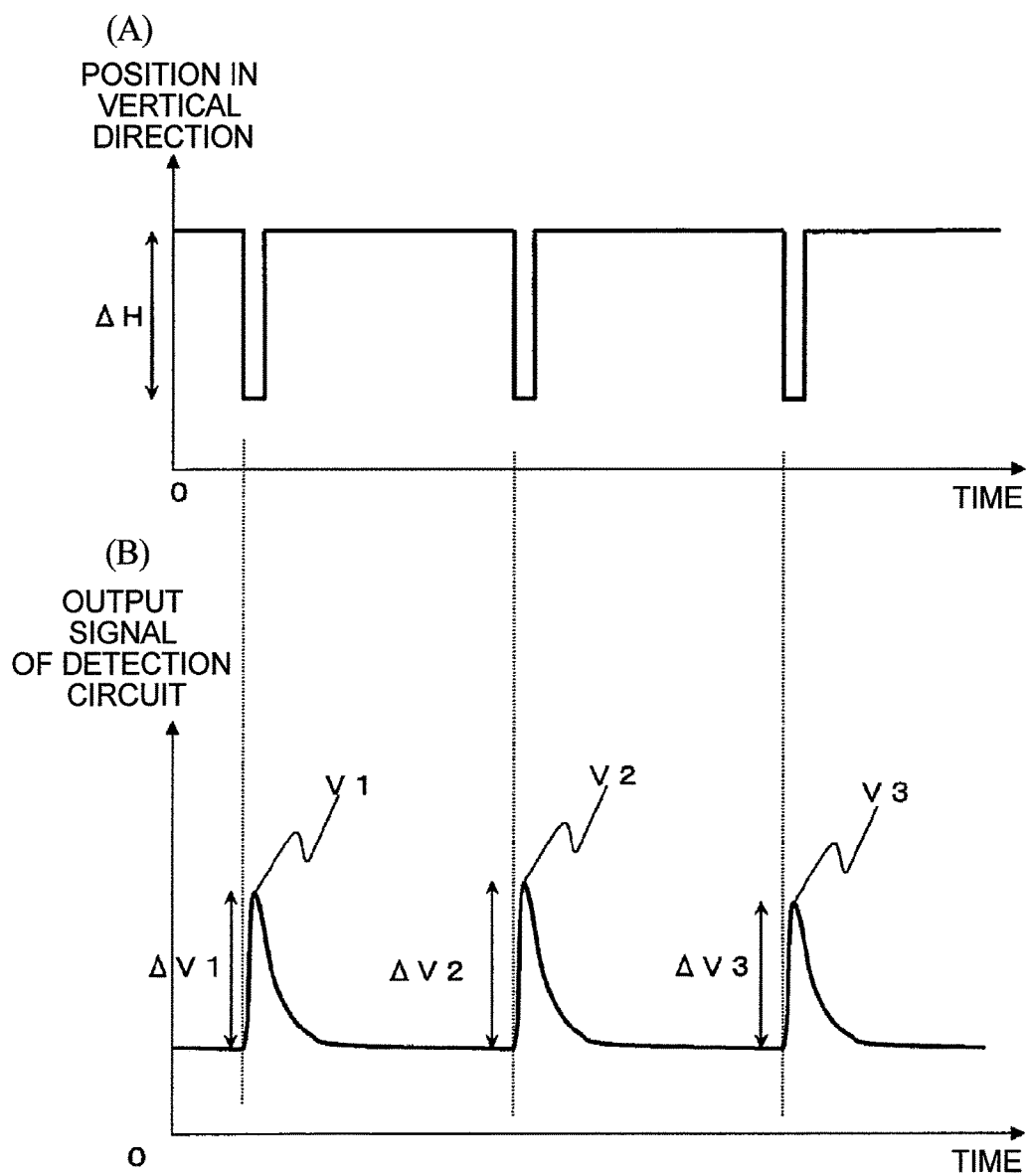
FIG. 22 are explanatory diagrams for showing output of a detection circuit included in the pressure change measuring apparatus according to the fourth embodiment.

First, the determination unit 61 stands by until a setting signal indicating the instruction to set the reference value is received from the connected user interface (Step S1501). When the determination unit 61 receives the setting signal (Step S1501; Y), the differential pressure control unit 64 is driven to vibrate the cavity casing 3 and the differential pressure measuring cantilever 4 in the vertical direction (Step S2101). Then, the outer pressure Pout changes depending on a movement amount in the vertical direction, and the pressure difference LP occurs between the cavity 10 and the outside. In this case, for example, a pulse-shaped vertical movement is exhibited at fixed time intervals. A relationship between the output signal and the movement amount in the vertical direction obtained at this time is described with reference to FIG. 22. When the pulse-shaped movement is exhibited toward a downward direction with a movement amount of ΔH (see FIG. 22 (A)), the output signal of the detection circuit corresponding to the movement is obtained (see FIG. 22 (B)). A width of the change in output signal exhibited at this time is represented by each of ΔV1 to ΔV3, and a local maximum value of the output signal obtained immediately after the movement is represented by each of V1 to V3.

Subsequently, the reference value setting unit 60 detects the output signal of the detection circuit 22 (Step S901), and stores the output signal in the storage device (Step S902).

Subsequently, the reference value setting unit 60 obtains a relation between the amounts ΔV1 to ΔV3 of change in output signal value obtained at an occurrence of the movement in the vertical direction and the amount of the change in outer pressure Pout based on the movement amount in the vertical direction ΔH (Step S1502). The reference value setting unit 60 calculates the reference value from the relation and the local maximum values V1 to V3 of the output signal obtained immediately after the occurrence of the movement in the vertical direction (Step S1503). In this case, the reference value can be calculated from each of the local maximum values V1 to V3 obtained at each movement, and an average of, for example, three calculated reference values is obtained and set as a final reference value.

Subsequently, the reference value setting unit 60 outputs the reference value and the output signal to the arithmetic processing unit (Step S905).

Subsequently, the determination unit 61 of the reference value setting unit 60 determines whether or not the change in output signal falls within a predetermined range with respect to a given movement amount in the vertical direction (Step S907). When the change falls out of the range (Step S907; N), the determination unit 61 displays an error (Step S1504), and brings the processing to an end. When the change falls within the range (Step S907; Y), the determination unit 61 executes the same processing as described above.

In this case, a vibration is given a plurality of times with the same movement amount ΔH in the vertical direction, and the reference value is obtained from the obtained responses of the output signals. However, with a known movement amount, the amount of the change in outer pressure Pout exhibited at that time can be calculated, and hence a reference value can be calculated even by giving a plurality of kinds of movement amounts in the vertical direction. The example of calculating the relation between the output signal and the movement amount in the vertical direction is described, but the setting of the reference value can be achieved also by storing in advance the relation in the storage device as a database and reading the relation as necessary.

With this configuration, the pressure difference ΔP can be controlled to occur with a vertical movement amount, which allows the user to conduct the operation for setting the reference value. Further, the pressure difference ΔP can be controlled to occur, and the output signal value under the state in which the pressure difference ΔP is zero can be predicted from the relation with the response of the output signal obtained at that time. Therefore, it is possible to set the accurate reference value, and to measure the change in outer pressure Pout with high accuracy.

The differential pressure control unit 64 is not limited to the direct-acting actuator configured to cause a vibration in the vertical direction. A configuration of the pressure change measuring apparatus 1 that does not use the direct-acting actuator is illustrated in FIG. 23.

Figure 23:
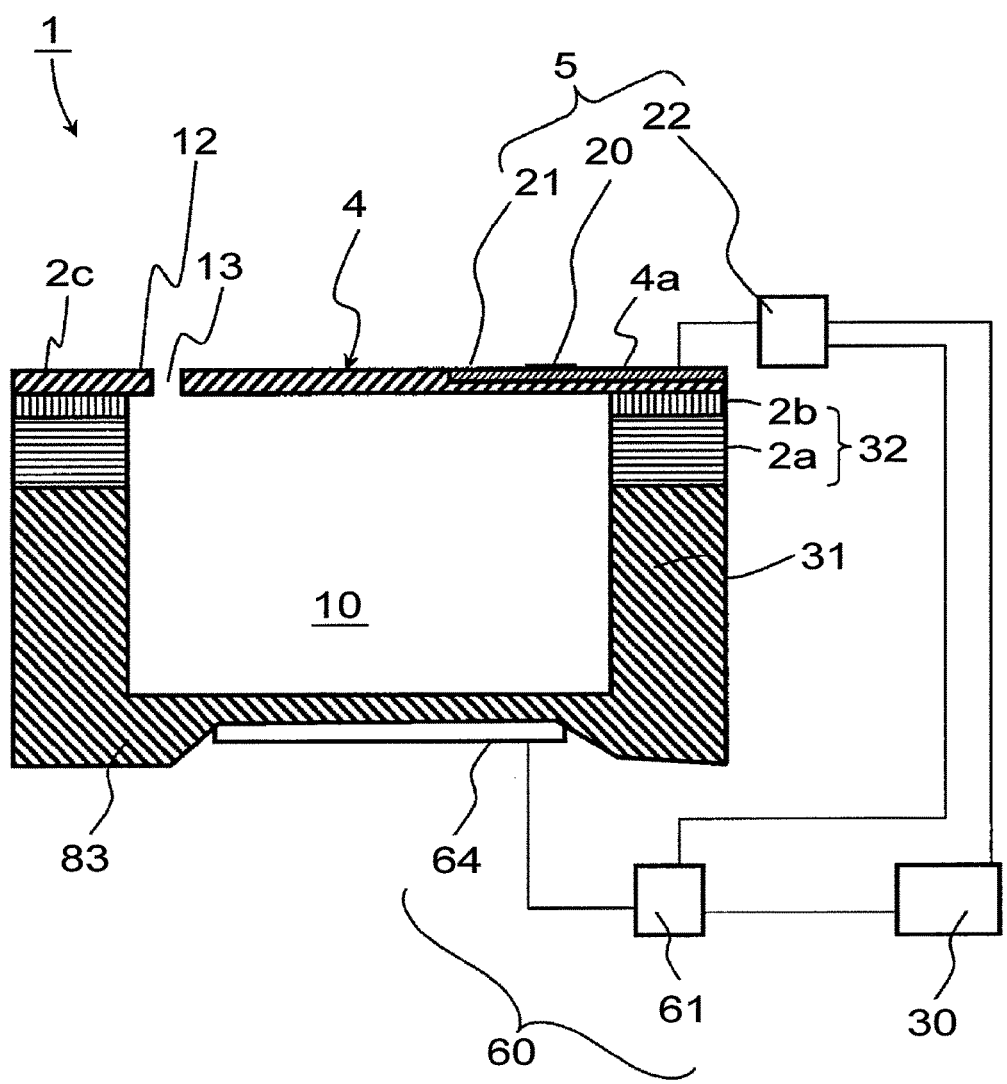
FIG. 23 is a sectional view for illustrating cross-sectional structure of a pressure change measuring apparatus according to a modification example of the fourth embodiment.

A cavity casing 83 with a membrane illustrated in FIG. 23 has one surface including a membrane actuator. The membrane actuator functions as the differential pressure control unit 64. That is, the inner pressure Pin of the cavity is controlled by deforming a membrane part. By changing the inner pressure Pin of the cavity, it is possible to cause the pressure difference ΔP between both sides of the differential pressure measuring cantilever 4. Therefore, the above-mentioned reference value generation processing can be executed even without using the direct-acting actuator, and it is possible to accurately set the reference value.

Fifth Embodiment

The reference value setting unit 60 used for the pressure change measuring apparatus 1 according to a fifth embodiment of the present invention is described. The same components as those of the pressure change measuring apparatus according to any of the first to fourth embodiments described above are denoted by like names and like reference symbols, and descriptions thereof are omitted.

5-1: Overall Configuration

The reference value setting unit 60 used for the pressure change measuring apparatus 1 according to the fifth embodiment is different from any one of the first to fourth reference value setting units 60 in that the reference value setting unit 60 is formed of a filter.

The output signal output from the detection circuit 22 is input to the reference value setting unit 60.

The reference value setting unit 60 is formed of a high pass filter having a cutoff frequency being an extremely low frequency. Therefore, the signal input from the detection circuit 22 is to be output as a signal corresponding to the frequency characteristic of the reference value setting unit 60. The signal is output after a range of roughly from a direct voltage to the cutoff frequency is cut, and is therefore output with the reference value being zero. Therefore, as the output signal obtained from the reference value setting unit 60, a signal corresponding to a fluctuation of the pressure having a frequency exhibiting higher speed than the cutoff frequency can be output with the reference value being zero.

The above-mentioned cutoff frequency can be set with the frequency of the fluctuation of the pressure to be measured, and is desired to be smaller than the cutoff frequency of the frequency characteristic of the pressure change measuring apparatus 1, which is defined based on the configurations of the cavity casing 3 and the differential pressure measuring cantilever 4 and properties of the pressure transmission medium.

Further, the reference value setting unit 60 may be formed not only through use of the filter but also through use of the filter and a comparator. The output signal obtained from the detection circuit is divided into two, and one is input to the above-mentioned high pass filter. The other one of the output signal and the output signal output from the high pass filter are input to the comparator, and a difference between both the signals is arithmetically operated. An output of the comparator is obtained by adding the reference value and a signal caused to pass through a band pass filter between the cutoff frequency of the high pass filter and the cutoff frequency of the pressure change measuring apparatus 1.

Therefore, the output signal obtained from the comparator is a signal that fluctuates about the reference value with an extremely low frequency. Therefore, it is possible to calculate the reference value by averaging the signals output from the comparator. Therefore, it is possible to accurately set the reference value, and to accurately measure the change in outer pressure Pout through use of the reference value.

The embodiments of the present invention have been described above, but the present invention is not limited to the configurations of the above-mentioned embodiments. To give an example, it is also possible to combine the detection of the stationary state according to the second embodiment with the configuration of the third embodiment, in which the valve is mounted to the cavity casing, to generate the reference value signal by opening the valve when the stationary state is detected.

Further, the apparatus and method for measuring the change in pressure to be measured have been described, but the present invention can be applied to, for example, an apparatus for measuring the change in pressure to be measured, converting the change into another physical quantity, and measuring the change in another physical quantity. As the another physical quantity, for example, the movement amount in the vertical direction described in the second embodiment, a change in volume due to expansion, contraction, or the like of a gas, and conversion from the change in volume to a change in temperature or the like are also conceivable. That is, it is also possible to use the apparatus as an altitude measuring apparatus for measuring an altitude by converting the change in pressure to be measured, which is obtained from the pressure change measuring apparatus, into an altitude information amount and outputting the altitude information amount. According to this configuration, for example, when the user measures the altitude, it is possible to allow the user to measure the change in altitude with high accuracy after eliminating as noise the change in atmospheric pressure that accompanies a change in weather condition.

REFERENCE SIGNS LIST

1 pressure change measuring apparatus
2 SOI substrate
3 cavity casing
4 differential pressure measuring cantilever (cantilever)
5 displacement measuring unit
10 cavity
12 lid
13 gap
15 through hole
16 groove portion
20 piezoresistor
22 detection circuit
30 arithmetic processing unit
31 differential pressure calculating unit
32 pressure-to-be-measured calculating unit
33 flow rate calculating unit
34 inner pressure updating unit
40 thermal type differential pressure gauge
41 temperature sensor
42 heater
43 flow channel
60 reference value setting unit
61 determination unit
62 detection unit
63 pressure adjusting unit
64 differential pressure control unit
70 adjustment circuit
80 casing with air hole
83 cavity casing with membrane
90 differential pressure sensor

The invention claimed is:

1. A pressure change measuring apparatus for measuring a change in pressure to be measured, comprising:
    a differential pressure sensor, which has a cavity into which a pressure transmission medium for transmitting the pressure to be measured flows and a communication hole for allowing the pressure transmission medium to flow into and out of the cavity, and is configured to output an output signal including information relating to a pressure difference between an inner pressure of the cavity and the pressure to be measured;
    an arithmetic processing unit configured to calculate the change in pressure to be measured; and
    a reference value setting unit configured to set a reference value signal indicating a reference value of the output signal of the differential pressure sensor based on the output signal under a predetermined state in which the pressure difference falls within a predetermined range,
    wherein the arithmetic processing unit comprises:
        a differential pressure calculating unit configured to calculate the pressure difference between the inner pressure of the cavity and the pressure to be measured based on the output signal and the reference value signal;
        a pressure-to-be-measured calculating unit configured to calculate the pressure to be measured based on a set value of the inner pressure of the cavity set in advance and the pressure difference calculated by the differential pressure calculating unit;
        a flow rate calculating unit configured to calculate a flowing quantity of the pressure transmission medium flowing into and out of the cavity for a predetermined time period based on the pressure difference calculated by the differential pressure calculating unit; and an inner pressure updating unit configured to calculate the inner pressure of the cavity after the predetermined time period based on the flowing quantity calculated by the flow rate calculating unit and a volume of the cavity, and to update, to the calculated inner pressure, the set value of the inner pressure of the cavity to be used by the pressure-to-be-measured calculating unit.

2. A pressure change measuring apparatus according to claim 1, wherein:
the reference value setting unit comprises a determination unit configured to generate the reference value signal based on the output signal of the differential pressure sensor; and
the determination unit is configured to determine whether or not a distribution of output signals of the differential pressure sensor falls within a predetermined range, and to determine that the predetermined state is effective when determining that the distribution falls within the predetermined range, to thereby generate the reference value signal.

3. A pressure change measuring apparatus according to claim 2, wherein:
the reference value setting unit further comprises a detection unit configured to detect presence or absence of the change in pressure to be measured; and
the determination unit is configured to determine whether or not the distribution of the output signals of the differential pressure sensor falls within the predetermined range when the detection unit detects that there is no change in pressure to be measured.

4. A pressure change measuring apparatus according to claim 3, wherein:
the detection unit comprises an absolute pressure sensor configured to detect an absolute pressure around the pressure change measuring apparatus; and
the determination unit is configured to detect the presence or absence of the change in pressure to be measured based on a change in output signal of the absolute pressure sensor.

5. A pressure change measuring apparatus according to claim 3, wherein:
the detection unit comprises a casing with an air hole, which is provided between the differential pressure sensor and the pressure to be measured, and a flow rate sensor connected to the air hole; and
the determination unit is configured to detect the presence or absence of the change in pressure to be measured based on the change in output signal of the flow rate sensor.

6. A pressure change measuring apparatus according to claim 3, wherein:
the detection unit is further configured to detect whether or not the pressure change measuring apparatus is in a stationary state; and
the determination unit is configured to determine whether or not the distribution falls within the predetermined range when the detection unit detects that the pressure change measuring apparatus is in the stationary state.

7. A pressure change measuring apparatus according to claim 6, wherein:
the detection unit comprises an inertia sensor configured to detect an inertial force acting on the pressure change measuring apparatus; and
the determination unit is configured to detect the stationary state based on the change in output signal of the inertia sensor.

8. A pressure change measuring apparatus according to claim 6, wherein:
the detection unit comprises a positioning system mechanism configured to acquire positioning information on the pressure change measuring apparatus; and
the determination unit is configured to detect the stationary state based on a change in positioning information acquired by the positioning system mechanism.

9. A pressure change measuring apparatus according to claim 2, wherein:
the reference value setting unit further comprises a pressure adjusting unit configured to equalize the inner pressure of the cavity and the pressure to be measured; and
the determination unit is configured to cause the pressure adjusting unit to conduct adjustment for equalizing the inner pressure of the cavity and the pressure to be measured before acquiring the output signal from the differential pressure sensor.

10. A pressure change measuring apparatus according to claim 9, wherein the pressure adjusting unit comprises an opening-and-closing mechanism configured to open and close an air hole provided separately from the communication hole for allowing outdoor air to flow into the cavity.

11. A pressure change measuring apparatus according to claim 2, wherein:
the reference value setting unit further comprises a differential pressure control unit configured to change the pressure difference to a predetermined value; and
the determination unit is configured to cause the differential pressure control unit to control the pressure difference to change before acquiring the output signal from the differential pressure sensor.

12. A pressure change measuring apparatus according to claim 11, wherein the differential pressure control unit comprises a membrane actuator provided to a cavity casing that defines the cavity.

13. A pressure change measuring apparatus according to claim 1, wherein the differential pressure sensor comprises:
a cantilever, which is provided so as to block an opening surface of the cavity other than the communication hole, and is configured to bend to be deformed depending on the pressure difference between the inner pressure of the cavity and the pressure to be measured; and
a displacement measuring unit configured to measure a displacement corresponding to the flexural deformation of the cantilever.

14. A pressure change measuring apparatus according to claim 1, wherein:
the differential pressure sensor is formed of a passage shape in which the communication hole communicates to/from an opening portion of the cavity; and
the differential pressure sensor comprises:
a heat source arranged inside the communication hole;
a pair of temperature sensors arranged across the heat source with equal intervals; and
a differential pressure measuring unit configured to measure a pressure difference between both ends of the communication hole based on output signals of the pair of temperature sensors.

15. An altitude measuring apparatus, comprising the pressure change measuring apparatus according to claim 1,
wherein a change in pressure to be measured obtained from the pressure change measuring apparatus is converted into an altitude information amount and output.

16. A pressure change measuring method for measuring a change in pressure to be measured by a pressure change measuring apparatus comprising a differential pressure sensor, which has a cavity into which a pressure transmission medium for transmitting the pressure to be measured flows and a communication hole for allowing the pressure transmission medium to flow into and out of the cavity, and is configured to output an output signal including information relating to a pressure difference between an inner pressure of the cavity and the pressure to be measured, the pressure change measuring method comprising:

- a reference value generating step of generating a reference value signal based on the output signal of the differential pressure sensor under a predetermined state in which the pressure difference falls within a predetermined range;
- a differential pressure calculating step of calculating the differential pressure between the inner pressure of the cavity and the pressure to be measured based on the output signal and the reference value signal;
- a pressure-to-be-measured calculating step of calculating the pressure to be measured based on a set value of the inner pressure of the cavity set in advance and the differential pressure calculated in the differential pressure calculating step;
- a flow rate calculating step of calculating a flowing quantity of the pressure transmission medium flowing into and out of the cavity for every unit of a predetermined time period based on the differential pressure calculated in the differential pressure calculating step; and
- an inner pressure updating step of calculating the inner pressure of the cavity after the predetermined time period based on the flowing quantity calculated in the flow rate calculating step and a volume of the cavity, and updating, to the calculated inner pressure, the set value of the inner pressure of the cavity to be used in the pressure-to-be-measured calculating step.

* * * * *